(12) United States Patent
Horst et al.

(10) Patent No.: US 7,365,463 B2
(45) Date of Patent: Apr. 29, 2008

(54) HIGH-TORQUE MOTOR

(75) Inventors: Robert W. Horst, San Jose, CA (US); Richard R. Marcus, Mountain View, CA (US)

(73) Assignee: Tibion Corporation, Moffett Field, CA (US)

( * ) Notice: Subject to any disclaimer, the term of this patent is extended or adjusted under 35 U.S.C. 154(b) by 248 days.

(21) Appl. No.: 11/033,368

(22) Filed: Jan. 10, 2005

(65) Prior Publication Data

US 2006/0152098 A1 Jul. 13, 2006

(51) Int. Cl.
*H02K 23/60* (2006.01)
(52) U.S. Cl. ........................................ 310/120; 242/410
(58) Field of Classification Search ................ 310/120; 242/410
See application file for complete search history.

(56) References Cited

U.S. PATENT DOCUMENTS

| | | | |
|---|---|---|---|
| 3,899,383 A * | 8/1975 | Schultz et al. | 156/396 |
| 3,925,131 A * | 12/1975 | Krause | 156/159 |
| 5,463,526 A | 10/1995 | Mundt | |
| 5,525,642 A | 6/1996 | Cipriano et al. | |
| 5,916,689 A | 6/1999 | Collins et al. | |
| 5,931,756 A | 8/1999 | Ohsono et al. | |
| 6,062,096 A | 5/2000 | Lester | |
| 6,119,539 A | 9/2000 | Papanicolaou | |
| 6,694,833 B2 | 2/2004 | Hoehn et al. | |

OTHER PUBLICATIONS

Gogoia, M et. al., "Design of a PZT-Actuated Proportional Drum Brake," *IEEE* 4(4):409-416, (1999).
Fitch, C.J., "Development of the Electrostatic Clutch," *IBM Journal* 46-56, (1957).
Patras, N., et al., "Electro-Rheological Fluids in the Design of Clutch Systems for Robotic Applications," *IEEE* 554-558, (1992).
Takesue, N., et al., "Development and Experiments of Actuator Using MR Fluid," *IEEE* 1838-1843, (2000).
Trimmer, W., et al., "An Operational Harmonic Electrostatic Motor," *IEEE* 13-16, (1989).

* cited by examiner

*Primary Examiner*—Dang Le
(74) *Attorney, Agent, or Firm*—Schneck & Schneck; Thomas Schneck

(57) ABSTRACT

A motor that delivers high force linear motion or high torque rotary motion to a moving element. The motor may include a driving brake, a driver, a holding brake and a flexible moving element. Operation of the motor may involve activating the holding brake, activating the driver to flex the moving element, activating the holding brake to maintain the position of a portion of the moving element, releasing the driving brake, and restoring the moving element to an unflexed position. The elements are arranged to provide linear motion, belt-driven rotary motion, or directly-coupled rotary motion using brakes and drivers arranged in linear or circular fashion. Drivers may be linear or rotary actuators or motors based on electrostatic, piezoelectric, magnetic, or electrostrictive properties. The brakes may be applied through electrostatic forces, magnetic forces, or mechanical gears engaged with a linear or rotary driving mechanism.

22 Claims, 23 Drawing Sheets

300D →

300E →

300F →

400D →

400E →

700A

700B

700C

HIGH-TORQUE MOTOR

CROSS-REFERENCE TO RELATED APPLICATIONS

This application claims priority to U.S. Provisional Application 60/642,398, entitled HIGH-TORQUE MOTOR, filed Jan. 7, 2005, which is hereby incorporated by reference.

BACKGROUND

This application relates generally to motors. The teachings are considered particularly applicable in the field of robotics and active orthotics.

Motors are used in a wide variety of applications. In many applications, including robotics and active orthotics, it may be useful to imitate characteristics similar to human muscles. Such characteristics include, for example, the ability to deliver high torque at a relatively low speed, and to allow free-movement when power is removed, thereby allowing a limb to swing freely during portions of the movement cycle.

With a standard DC motor, torque varies directly in proportion to the motor current. This relationship is expressed as a torque constant, $K_T$, which may be in N-m per amp. The same constant relates voltage to rotation speed. In SI units, $K_V = K_T$, which may be in Volts/rad/s. A DC motor is normally designed with a single torque constant. This means the motor operating at a fixed power input cannot dynamically trade off speed for torque. Accordingly, manufacturers typically sell families of motors with different motor constants depending on whether the application needs high torque (high $K_T$) or high speed (low $K_V$). This is a significant drawback for applications that require relatively fast, low torque operations as well as slower, high torque example, imitate the modes of operation of human muscles, which allow the same arm to swat a fly (fast, low torque) and to lift a heavy weight (slow, high torque).

Standard electric motors typically operate at thousands of RPMs, and the range of typical motor constants does not extend down to the point where standard motors can deliver extremely high torque at low speed. In order to provide this capability, a reduction gear must be added to convert the motor's high speed and low torque into the desired low speed and high torque. Current reduction gearing techniques include spur gears, worm gears, pulleys and harmonic drive gears. All of these techniques decrease efficiency and have other undesirable characteristics including the addition of cost, weight, volume, and noise. Also, when an output shaft is driven through a high gear ratio, it is difficult to turn the output shaft when the motor is not powered. The absence of an unpowered free-movement mode is a significant disadvantage in some applications.

Most motors are also inefficient when moving slowly while holding tension against an external load. In order for a slowly moving motor to hold its current position, significant current must be applied to the motor windings and this current results in large power dissipation even though no work is being performed on the output load. A mechanical reduction gear, such as a worm gear, can avoid this power loss when moving slowly, but this type of gearing also makes the free movement mode impossible.

SUMMARY

A technique for dynamically and efficiently delivering, alternatively, high torque or high speed involves providing multiple brakes along a flexible moving element called a flexor. In different embodiments, the flexor may include, for example, a long strip with load connected at one end to form a linear actuator, a belt coupled to an output gear coupled to the load, or a disk that is flexed around its periphery and coupled to an output shaft at its center. The brakes may be arranged in pairs along the length of a linear or belted motor or around the circumference of a rotary motor.

Between each pair of brakes ("Brake 1" and "Brake 2") is a driver which, in an embodiment, acts primarily at right angles to the flexor to cause the flexor to bend or otherwise deflect. The driver may include a linear actuator, a motor with cam, a motor with offset rollers, a piezoelectric bender, or other technology that delivers a force to bend the flexor. A first step of operation involves activating both Brake 1 and the driver. The activation of the driver then bends the flexor and causes the part of the flexor near Brake 2 to move a small distance toward Brake 1. A second step involves activating Brake 2, and a third step involves releasing Brake 1 and deactivating the driver. During the third step, the flexor may be restored to its unbent position. The cycle then repeats with the first step to impart a repetitive linear or rotary motion to the flexor.

The amount of movement of load during each activation of the driver may be associated with the distance between the brakes and the amount of deflection of the flexor. When the deflection imparted by the driver is small compared to the distance between the brakes, the mechanical advantage is large, and a relatively weak driver force can move the free portion of the flexor a small distance against a strong load force resisting the movement. In this situation, the driver has a mechanical advantage against the load because the load is pulling at nearly right angles to the driving force. As the driver deflection distance increases, the driving force vector rotates and the component of the driving force vector opposing the load force increases, thereby decreasing the mechanical advantage. The mechanical advantage is approximately determined by the formula:

$$\text{Mechanical\_Advantage} = \frac{1}{1 - \cos(\theta)},$$

where $\theta$ is the angle of deflection. It may be noted that mechanical advantage goes to infinity as $\theta$ approaches zero.

When drivers or brakes are engaged, a force acts on the flexor. However, in an embodiment, when the drivers or brakes are disengaged, the force does not act on the flexor and the flexor is free to move, thus providing a "free movement mode." Brakes may be implemented through electrostatics, magnetics, actuators with gears or brake pads, or other means. If the brakes are implemented using electrostatics, very little power is dissipated when holding in the active position, providing a low power locked mode as well as an "unpowered free movement mode." Very little power is dissipated when moving slowly, because the flexor is held by the electrostatic brakes between driver activations.

Many driver technologies, including motors and piezoelectric benders, can operate in either an actuator (motor) mode or a generator mode. A motor constructed according to the technique described herein can sequence the brakes and motor phases in such a way as to extract energy from the movement of the load instead of supplying energy to move the load. The "generator mode" can be used in applications calling for regenerative braking to extend battery life or make the operation of the motor more efficient.

Thus, a motor may be constructed that provides high torque and allows the torque to be traded for speed at a given power level. In various embodiments, the motor may have low-power or unpowered modes to hold the current position, or to allow free movement.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

Figure 1:
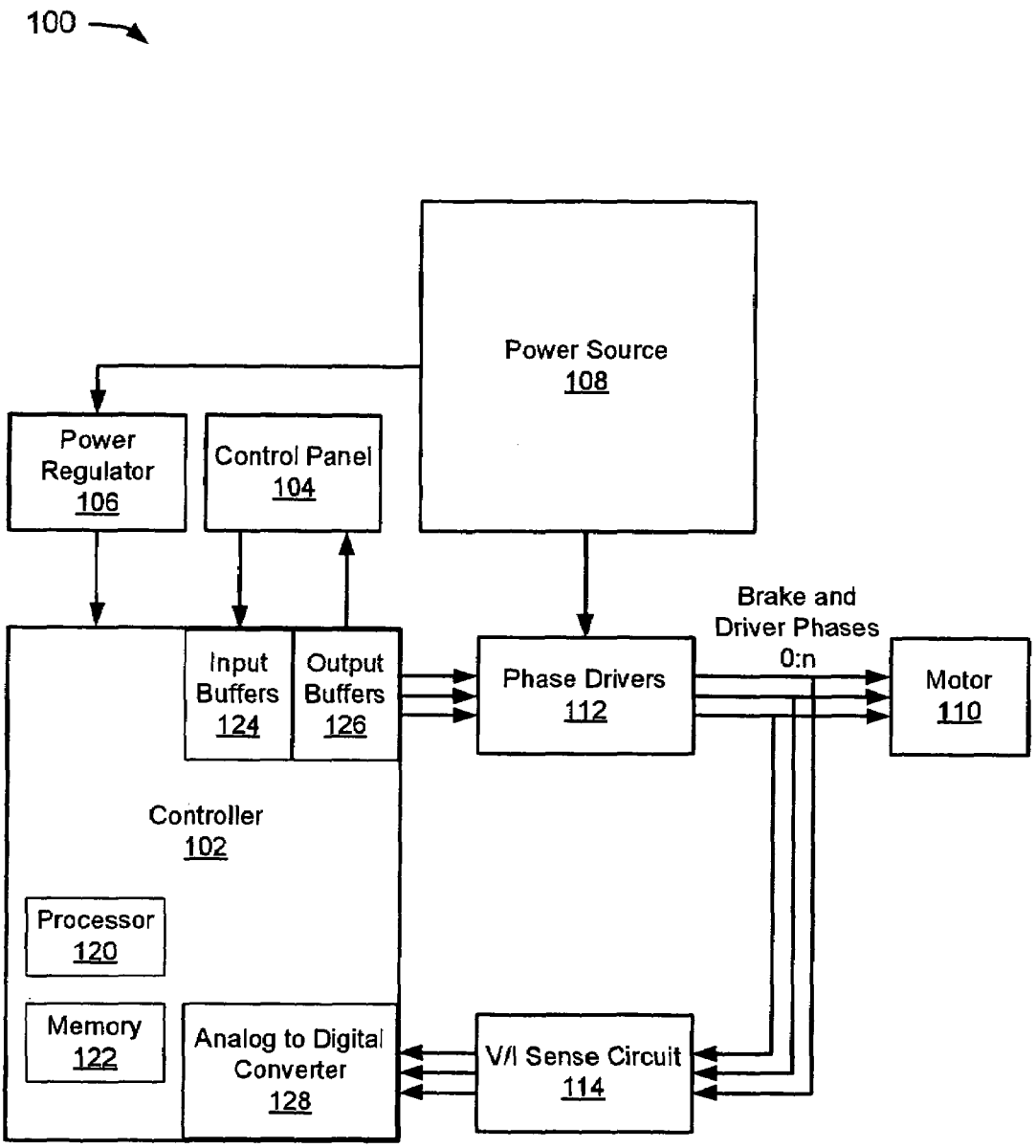
FIG. 1 depicts a conceptual view of a system according to an embodiment.

FIG. 1 depicts a conceptual view of a system 100 according to an embodiment. In the example of FIG. 1, the system 100 includes a controller 102, a control panel 104, a power regulator 106, a power source 108, a motor 110, phase drivers 112, and a V/I sense circuit 114. The controller may further include a processor 120, memory 122, input buffers 124, output buffers 126, and an analog-to-digital converter 128. The controller 102 may be, for example, a microcontroller.

In an embodiment, the control panel 104 may include one or more I/O controllers (not shown) for devices, such as a keyboard, disk drives, printers, a scanner, and other input and output devices, including a mouse or other pointing device. A display controller may control in the conventional manner a display on the control panel 104, which can include, for example, a cathode ray tube (CRT) or liquid crystal display (LCD). The display controller and the I/O controllers can be implemented with conventional well-known technology, if desired.

In an embodiment, the power source 108 may include a power supply. Alternatively, the power source 108 may include a battery or multiple batteries (such as a primary battery and a backup battery). In a mobile embodiment, the power source 108 may be configurable between a portable power source, such as a battery, and a non-portable power source, such as power from an outlet.

In an embodiment, the motor 110 includes brakes and drivers. In another embodiment, the phase drivers 112 may have an appropriate timing relation ship for activating the brakes and drivers of the motor 110. The phase drivers 112 may generate currents or voltages based on the characteristics of a particular driver or brake that is activated by that phase.

In an embodiment, the input buffers 124 and output buffers 126 are used for receiving and sending signals or messages in a manner that is known in the art of computer engineering. In another embodiment, the analog-to-digital converter 128 may be logic that converts analog signals to digital signals in a manner that is well-known in the art of electronics.

In an embodiment, the system 100 may include interfaces to external systems through a communications interface, such as a modem or network interface (not shown). In another embodiment, the processor 120 may be a microprocessor, such as an Intel Pentium microprocessor or Motorola power PC microprocessor. In an embodiment, the memory 122 may be coupled to the processor 120 via a bus (not shown). In another embodiment, the bus may couple the processor 120 to one or more other components as well.

In an embodiment, the memory 122 may include random access memory (RAM) and/or flash memory. In another embodiment, the memory 122 may include dynamic RAM (DRAM), static RAM (SRAM), flash memory, and/or non-volatile storage. The non-volatile storage is often a magnetic hard disk, an optical disk, or another form of storage for large amounts of data. Some of this data is often written, by a direct memory access process, into the memory 122 during execution of applications in, for example, RAM. One of skill in the art will immediately recognize that the terms "machine-readable medium" or "computer-readable medium" includes any type of storage device that is accessible by the processor 120 and also encompasses a carrier wave that encodes a data signal.

The system 100 is one example of many possible systems which have different architectures. A typical computer system will usually include at least a processor, memory, and a bus coupling the memory to the processor. In addition, the system 100 may be controlled by operating system software. One example of an operating system software is the family of operating systems known as Windows® from Microsoft Corporation of Redmond, Wash. Another example of operating system software is the Linux operating system. The file management system associated with an operating system is typically stored in the non-volatile storage and causes the processor 120 to execute the various acts required by the operating system to input and output data and to store data in memory 122, including storing files in non-volatile storage (if applicable).

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein, in some embodiments, also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

Referring once again to FIG. 1, in operation, the controller 102 programmatically controls one or more of the other components based on inputs from the control panel 104. The power regulator 106 supplies power for the circuit from the power source 108. The controller 102 activates the motor 110 with the phase drivers 112. Output phases may be buffered by the phase drivers 112 and the buffered phases are sent to the motor 110. The phase drivers 112 outputs may be fed back to the controller 102 through the V/I sense circuit 114 to provide feedback. The feedback enables the controller 102 to determine when voltage or current have reached a threshold. In this way, the controller 102 may be able, for example, to limit the voltage or current to set a maximum torque of the motor 110. The feedback can also be used, for example, to determine the back-EMF of motor-based drivers to aid in the control of the motor 110.

Figure 2:
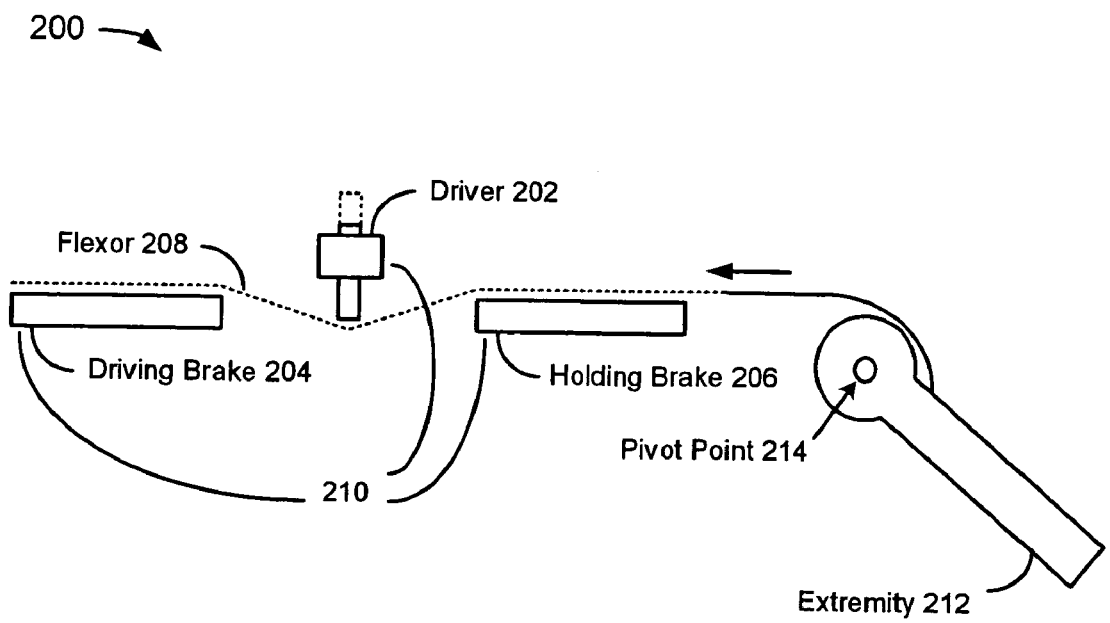
FIG. 2 depicts a conceptual view of a motor according to an embodiment.

FIG. 2 depicts a conceptual view of a motor 200 in an embodiment. The motor may be used as a motor, such as the motor 110, in a system such as the system 100 (FIG. 1). In the example of FIG. 2, the motor 200 includes a driver 202, a driving brake 204, a holding brake 206, and a flexor 208.

For illustrative purposes, an extremity 212 with a pivot point 214 is also depicted in FIG. 2. The driver 202 may be implemented in various embodiments as a linear actuator (e.g., a solenoid, piezoelectric stack, voice coil, etc.), a part of an electrostatic motor, a part of a magnetic motor, a part of a motor with a cam, a part of a motor with an offset roller, or a bender (e.g., piezoelectric, electro-active polymer bimorph or unimorph, etc.). Examples of driver technologies are described later with reference to FIGS. 3A to 3F.

The driving brake 204 and holding brake 206 may be implemented in various embodiments as electrostatic brakes (including, for example, multi-layer electrostatic brakes), mechanical friction brakes and mechanical gear brakes. Examples of brake technologies are described later with reference to FIGS. 4A to 4E.

The flexor 208 is a flexible "muscle" that, when flexed, acts to bend a limb, a flipper, or some other appendage at a joint. In the example of FIG. 2, the extremity 212 represents the appendage and the pivot point 214 represents the joint. The flexor 208 may be constructed from polymer film, such as polyester or polycarbonate, or some other material that can be bent by the force of the driver 202.

The driver 202, driving brake 204, and holding brake 206 may be referred to collectively as a stator 210. Thus, the motor 200 comprises the flexor 208 and the stator 210. The stator 210 may be thought of as the stationary part of the motor 200. The flexor 208 and stator 210 may be constructed from plastic films with conductive elements such as, for example, polyamide (e.g., Dupont Pyralux AP Kapton™ film) or polyester (Mylar™).

In a linear embodiment, the flexor 208 may be configured to slide left and right relative to the stator 210. Brakes 204 and 206 act at two different points to clamp the flexor 208 and prevent it from sliding at those points. The driver 202 may supply a driving force that bends the flexor 208 and drives, for example, the extremity 212 towards the stator 210.

In an electrostatic embodiment, the stator 210 may have a number of electrodes connected to electronics driving high voltage phases that sequence around the stator 210. The electrode phases may be patterned and etched using standard flex circuit processing technology, or the phases may be printed using a type of conductive ink or epoxy. The flexor 208 and stator 210 are separated by an insulating layer to prevent shorting. This layer may be a standard flex circuit cover film or a conformal coating. Alternatively, the stator 210 may be constructed by adding a conductive layer to a thin insulating film. Generally, although the insulation could be on the flexor 208, the stator 210, or both, some insulation is typically coupled to the stator 210 because it also serves to inhibit arcing between driven and undriven phases on the stator 210.

If the brakes 204, 206 or the driver 202 make use of electrostatic forces acting on the flexor 208, the flexor 208 typically has a conductive plate connected to one voltage. The voltage may be at ground potential, or some other voltage as long as the differential voltage from the flexor 208 (which may include a rotor) to the stator 210 is high enough to cause electrostatic attraction.

The performance of the motor 200 is related to the performance of the brakes. The maximum torque of the motor 200 should not be greater than the torque applied by either the driving brake 204 or the holding brake 206. Also, a maximum "pinch ratio" is determined partially by the amount of slip in the brakes which may become one of the limiting factors in high torque operations. As used herein, the pinch ratio (PRatio) is defined as the average rotational speed of the driver 202 divided by the average rotational speed of the output (at the pivot point 214).

Given the definition of PRatio, conservation of energy dictates that the average torque applied to a load is the average torque of the driver times the PRatio. Also, the maximum torque of the motor 200 is determined by the smaller of the force exerted by the brakes 204, 206 and the force supplied by the driver 202 times the PRatio. If the braking torque is exceeded, then an external force causes one or both of the brakes to slip. When the brakes 204, 206 are not the limiting factor and the motor 200 is driven against a strong external force, the driver force may limit movement if it is unable to deflect the flexor 208 all the way to its maximum distance.

When the driver 202 is linear instead of rotary, the deflection is naturally stopped at the point where the force supplied by the driver 202 matches the resisting force of the load divided by the PRatio. At the beginning of each stroke of a linear driver, the PRatio is initially large, allowing some deflection of the flexor. As the deflection increases, the PRatio decreases until the point where the driver force equals the load force divided by the PRatio. At that point, there is no more deflection of the flexor 208. Thus as the load increases, the reduced deflection typically decreases the output speed.

The maximum speed of the motor 200 may be governed by the slower of the speeds at which the driving or braking forces can be applied. Hence, small improvements in the brakes can have a large impact on performance. Brakes generate braking forces in proportion to the coefficient of friction (COF) between the moving and stationary parts of the brake. Various materials and surface treatments can be used to increase the COF, thereby improving the performance of the brakes without increasing the force normal to the surface of the brakes.

In operation, when the driving brake 204 is activated and the flexor 208 is bent by application of the driver 202, the extremity 212 is pulled upward (in the direction of the arrow), pivoting around the pivot point 214. The driving brake 204 holds the flexor 208 in place while the flexor 208 is bent.

At some point in time, the holding brake 206 may be activated to keep the flexor 208 in place while the driver 202 is retracted and the driving brake 204 released (to, for example, take out the "slack" in the flexor 208). When the driving brake 204 is released, the flexor 208 is restored to an unbent (e.g., unflexed) position. The restoring force may be supplied by the spring force in the flexor 208 material, by a mechanical linkage from the driver 202 that forces the slider to flatten as the driver 202 is deactivated, or by a second driver used to provide the restoring force.

While the holding brake 206 is applied, the extremity 212 may remain in a raised position until the driving brake 204 is again applied, the holding brake 206 released, and the driver 202 once again applied to bend the flexor 208. With repeated iterations, the extremity 212 can be raised or lowered. This operation is described again later with reference to FIG. 13.

It should be noted that the flexor 208 may be moved toward the left (in the direction of the arrow) or toward the right (in the opposite direction of the arrow). In the latter case, it may be necessary to swap the activation order of the brakes, effectively turning the driving brake 204 into a holding brake and the holding brake 206 into a driving brake. However, when moving towards the right, it is difficult to couple a large force to an output load because the force pushing to the right may exceed the force needed to buckle the flexor 208. In general, larger forces can be coupled when pulling on a flexible material than when pushing on the material. At an extreme, when the material is as flexible as, for example, a rope, the force that can be applied when pushing on a flexor of this material is inadequate for most applications.

FIGS. 3A to 3F depict conceptual diagrams of various driver technologies for use in various embodiments. While the driver technologies are offered as examples, the motor 200 is not restricted to using one of these technologies for the driver. An exhaustive list of every potential driver technology that could be used has not been attempted herein. In general, a technology that can impart a force to deflect the flexor 208 can probably be used, though some technologies may be more applicable and advantageous than others.

Figure 3A:
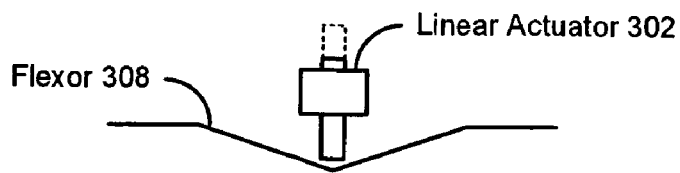
FIGS. 3A to 3F depict conceptual diagrams of various driver technologies for use in various embodiments.

FIG. 3A depicts a motor 300A that includes a linear actuator 302 and a flexor 308. Linear actuators are well known in the art and may include, for example, solenoids, voice coil actuators, and piezoelectric stacks. The end of linear actuator 302 may push directly on the flexor 308, or there may be a roller at the contact point to reduce the wear on the flexor 208. Various braking technologies, such as, for example, those described with reference to FIGS. 4A to 4E, may be used to facilitate movement of the flexor 308 to the left or right, as described herein.

Figure 3B:
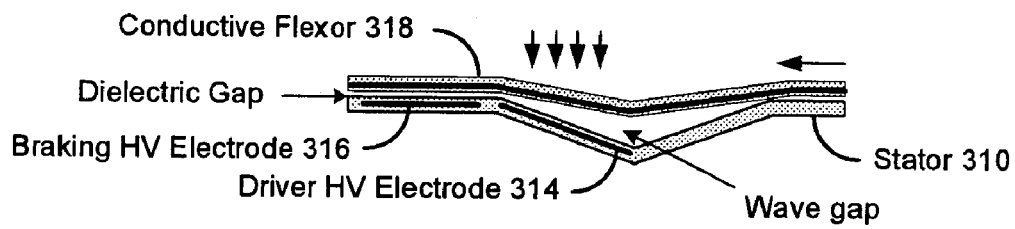

FIG. 3B depicts an electrostatic motor 300B that includes a stator 310, a driver HV electrode 314, a braking HV electrode 316, and a conductive flexor 318. Electrostatic driver technology operates by applying a high voltage between the conductive flexor 318 and the driver HV electrode 314 embedded in the stator 310. In the example of FIG. 3B, the stator 310 is formed into a wave with a wave gap between the driver HV electrode 314 and the conductive flexor 318.

The force of the driver may be proportional to the square of the electric field in the wave gap, and the electric field may be determined by the voltage divided by the wave gap distance at each point. The maximum voltage depends on the breakdown voltage of the material in the wave gap, and it may be advantageous to fill the wave gap with a material other than air. For example, the wave gap may be filled with a dielectric fluid (silicone oil, transformer oil or the like), a dielectric gas (such as SF6), or a dielectric elastomer (dielectric gel, silicone rubber). Alternatively, the driver may be operated in a vacuum to avoid the dielectric breakdown of any material in the wave gap.

When both the driver and brakes are electrostatic, as in the example of FIG. 3B, both the brake and driver electrodes may be formed as part of the stator 310. It is also possible to electrically connect the braking HV electrode 316 to the driver HV electrode 314, because they may be activated at the same time. In this case, the electrode formed as the combination of the braking HV electrode 316 and the driver HV electrode 314, will be called, for the purposes of example, the "Left Electrode." The Left Electrode performs the braking function at the top of each hill, and performs the driver function at the down slope of the hill to move the conductive flexor 318 towards the left. The Right Electrode (not shown) slopes the opposite direction, and is used to move the conductive flexor 318 towards the right. When moving the conductive flexor 318 one direction, say to the left, the Left Electrode is used as the driving brake and the driver, and the Right Electrode is used as the holding brake.

Figure 3C:
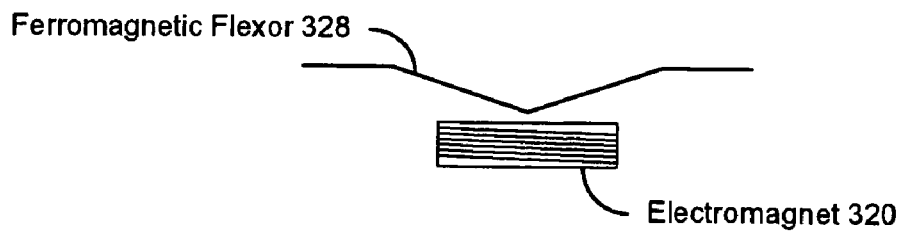

FIG. 3C depicts a magnetic motor 300C that includes an electromagnet 320 and a ferromagnetic flexor 328. In the example of FIG. 3C, the ferromagnetic flexor 328 should be made out of a ferromagnetic material in order to be attracted to the electromagnet 320. Possible materials include, for example, a flexible steel or iron alloy, or a polymer filled with a ferromagnetic material such as the type used to construct flexible magnets.

Figure 3D:
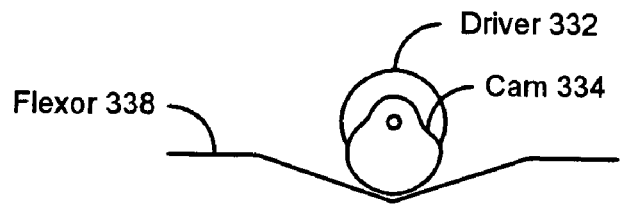

FIG. 3D depicts a motor 300D that includes a driver 332, a cam 334, and a flexor 338. The driver 332 may include, for example, a stepper motor, a servo motor, a brushless DC motor or a brush-type DC motor. Depending on the type of motor used, some type of position sensor, such as, for example, a hall effect switch or optical encoder, may be added to provide feedback to the electronics to allow proper commutation of the brakes (not shown).

By appropriately balancing the cam 334, the driver 332 can be run at a wide range of speeds without vibration, allowing the output speed of the motor 300D to be varied over a wide range through control of the driver 332. Alternatively, the driver 332 can be run at a single speed and the output speed of the motor 300D can be set by changing the pinch ratio via changes in the times when the brakes are activated.

When the cam 334 is in the position illustrated in FIG. 3D, the flexor 338 is deflected to its maximum position. When the cam 334 rotates 180 degrees, the small side of cam 334 faces the flexor 338 and, in an embodiment, no force is applied to the flexor 338 by the cam 334. The shape of the cam 334 determines the torque required at each deflection distance. By changing the shape of the cam 334, the torque profile for each rotation of the driver 332 can be tuned as desired.

It may be noted that, in an embodiment, the rotation direction of driver 332 does not determine the direction of movement of the flexor 338. Rather, the direction of movement is determined by whether the brake (not shown) to the right or the left of the driver 332 is activated. Hence the driver 332 can be run in a single direction and does not need to be reversed when the flexor 338 movement is reversed.

It may be further noted that the cam 334 can cause undesirable vibrations if its center of mass is not coincident with the motor shaft axis (not shown). The imbalance can be avoided, for example, with counterweights or a by using a balanced multiple-lobe cam. A cam with an even number of lobes can also be used to simultaneously drive two flexors (not shown) on opposite sides of the cam 334.

Figure 3E:
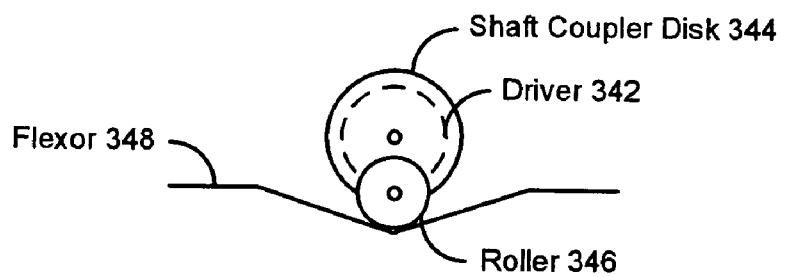

FIG. 3E depicts a motor 300E that includes a driver 342, a shaft coupler disk 344, an offset roller 346, and a flexor 348. In the example of FIG. 3E, the shaft coupler disk 344 couples the driver 342 to the offset roller 346. The driver 342 may include, for example, a stepper motor, a servo motor, a brushless DC motor or a brush-type DC motor. Depending on the type of motor used, some type of position sensor, such as, for example, a hall effect switch or optical encoder, may be added to provide feedback to the electronics to allow proper commutation of the brakes (not shown).

By appropriately balancing the offset roller 346, the driver 342 can be run at a wide range of speeds without vibration, allowing the output speed of the motor 300E to be varied over a wide range through control of the driver 342. Alternatively, the driver 342 can be run at a single speed and the output speed of the motor 300E can be set by changing the pinch ratio via changes in the times when the brakes are activated.

The offset roller 346 functions similar to a cam (see, e.g., FIG. 3D), but rolls instead of slides against the flexor 348, possibly reducing wear. The diameter of the offset roller 346 can be changed as desired to change the duty cycle during which the offset roller 346 deflects the flexor 348. Vibrations can be avoided through counterweights or with multiple rollers arranged to make the center of mass coincident with the motor shaft axis (not shown).

Figure 3F:
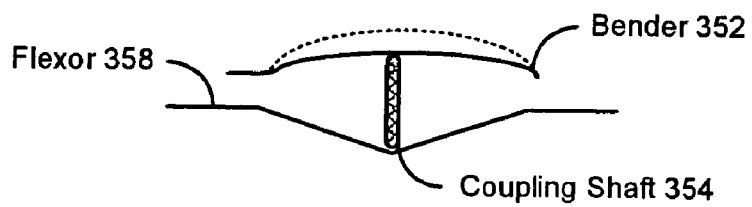

FIG. 3F depicts a motor 300F that includes a bender 352, a coupling shaft 354, and a flexor 358. The bender 352 may include, for example, piezoelectric or electro-active polymer bimorph or unimorph components. The driver acts on the flexor 358 through the coupling shaft 354. As in the other driver designs, the contact point between the coupling shaft 354 and the flexor 358 can be through a sliding contact or a roller.

Bender actuators are well known in the art and operate by laminating two materials together, one of which expands or contracts when powered. One type of piezoelectric bender is the FACE Thunder series of actuators. These actuators have a steel backing plate bonded to a piezoelectric material that expands or contracts upon application of an external voltage. The Thunder actuator is curved in its unpowered position. Applying one polarity of voltage causes is to flatten, and applying the opposite polarity causes it to bend further. Other benders include thermocouples and benders based on the electrostrictive and electrostatic properties of electro-active polymers.

The motor 200 (FIG. 2) may be implemented using any of the driver technologies described with reference to FIGS. 3A to 3F, or using other driver technologies (not shown). The motor 200 may also be implemented using any of a number of brake technologies. FIGS. 4A to 4E depict conceptual diagrams of various brake technologies for use in various embodiments. While the brake technologies are offered as examples, embodiments of motors described herein are not restricted to using one of these technologies for the brakes. An exhaustive list of every potential brake technology that could be used has not been attempted. In general, a technology that can impart a force to hold the flexor 208 in place can probably be used.

Figure 4A:
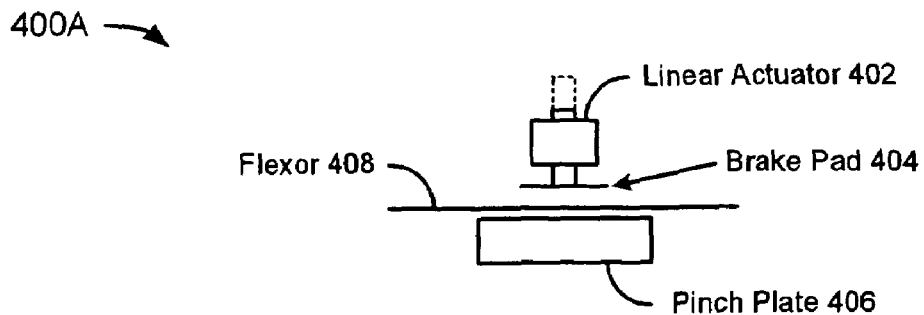
FIGS. 4A to 4E depict conceptual diagrams of various brake technologies for use in various embodiments.

FIG. 4A depicts a motor 400A that includes a linear actuator 402, a brake pad 404, a pinch plate 406, and a flexor 408. In the example of FIG. 4A, the linear actuator 402 pushes the brake pad 404 against the flexor 408 to pinch the flexor 408 against the pinch plate 406. The example of FIG. 4A can serve to represent any number of mechanical friction brakes. The linear actuator 402 may be replaced with any applicable driver technology, such as, for example, the technologies described with reference to FIGS. 3A to 3F. Advantageously, the mechanical friction brake may be operated such that the flexor 408 need not move in discrete steps. However, a strong linear actuator 402 may be required to apply the desired braking force.

In the example of FIG. 4A, the linear actuator 402 and the pinch plate 406 are vertically aligned. In operation, the linear actuator 402 (or some other driver) applies force at a first point along the flexor 408 (the driver contact point). The force moves the flexor 408 toward and/or compresses the flexor 408 against the pinch plate 406. The pinch plate 406 (or some other brake) stops the flexor 408 at a second point along the flexor 408 (the brake contact point). Since the driver and the brake are vertically aligned, the driver contact point and the brake contact point are also, at least approximately, vertically aligned. In an alternative embodiment, the linear actuator 402 and the pinch plate 406 may be offset (e.g., not in vertical alignment).

Figure 4B:
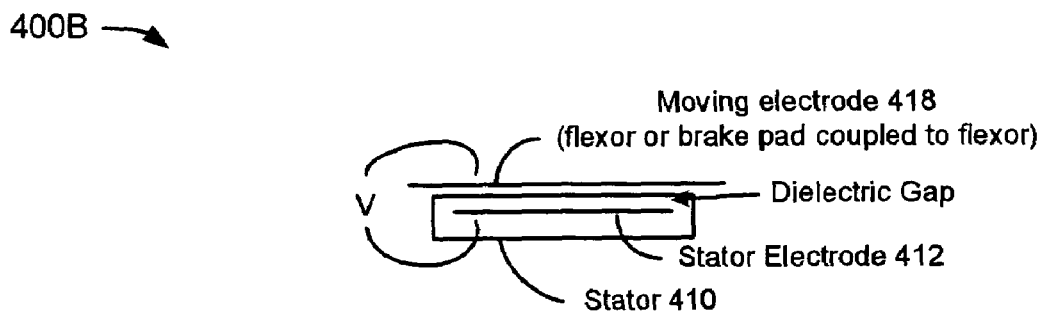

FIG. 4B depicts an electrostatic motor 400B that includes a stator 410, a stator electrode 412, and a moving electrode 418. A voltage, V, is applied between the stator electrode 412 and the moving electrode 418, which are separated by the dielectric gap. The moving electrode 418 may be a flexor, implemented using a flexible conductor, or it may be a separate moving plate that is, for example, mechanically coupled to the flexor.

Electrostatic brakes apply a force according to the equation:

$$BrakingForce = \frac{COF \cdot Area_b \cdot \varepsilon_0 \cdot \varepsilon_d \cdot V^2}{2 \cdot gap_d^2},$$

where COF is the coefficient of friction between the moving elements, $Area_b$ is the effective area of the braking electrode, $\varepsilon_0$ is the permittivity of free space ($8.854 \times 10^{-12}$ coulomb per volt-m), $\varepsilon_d$ is the relative dielectric constant of the material in the dielectric gap, V is the voltage between the plates, and $gap_d$ is the distance between the plates.

A maximum force of an electrostatic brake is determined by the breakdown voltage of the dielectric, hence a good insulator is typically used. Examples of insulating materials include polyester (Mylar), polyamide (Kapton), PVDF (Kynar) and Parylene. The brake may be constructed by applying a conductor to the surface of an insulating film, a conductor may be coated with the insulator by painting, silkscreening, spin coating, vapor phase deposition, or other means.

The conducting plates of an electrostatic brake may be formed with any suitable conductor such as a carbon or silver conductive ink, an etched copper layer of a flex circuit, or a sputtered thin layer of metal such as silver or nickel. When the dielectric layer is very thin, there may some potential for pinhole defects to form, shorting out the brake.

Capacitors are also formed from alternating layers of thin dielectric films and conductors. A technique used to improve the reliability of capacitors, called self-healing, can also be applied to electrostatic brakes to recover from such defects. Self healing works by using a very thin layer of sputtered metal for the electrodes. If a pinhole defect develops in the dielectric, the high current pulse vaporizes the metal near the defect. Thus the thin metal acts as a fuse to isolate defective regions of the brake while enabling the remainder of the brake area to function normally.

Another type of electrostatic brake can be made by replacing the insulating dielectric with a semiconducting layer. This technique makes use of the Johnson-Rahbeck effect and uses the types of materials that have been developed for electrostatic clutches (see U.S. Pat. Nos. 5,463,526 and 5,525,642, which are incorporated herein by reference). The Johnson-Rahbeck effect allows a small current to flow where the moving plate touches the semiconductor, but the current flows only through the high points in the surface irregularities, while a large electric field develops in the low points of the surface irregularities. Because the gap is very small at the low points, a small voltage can develop a very large force. Brakes making use of the Johnson-Rahbeck effect can be quite durable, because the semiconducting layer can be made quite thick. The thick layer does not affect the force developed because the electric field is not strongly dependent on the thickness of the semiconducting layer. However, these brakes are generally slower than electrostatic brakes with insulating layers, because the high resistance of the semiconducting layer introduces a long RC time constant for charging or discharging the electrodes when the brake is switched on or off.

Figure 4C:
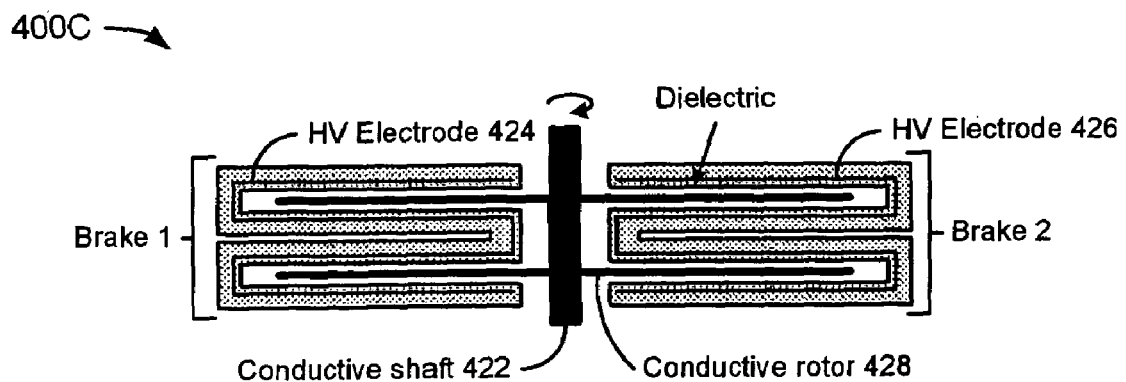

FIG. 4C depicts an electrostatic motor 400C that includes a conductive shaft 422, a HV electrode 424, a HV electrode 426, and a conductive rotor 428. The rotating shaft 422 may be mechanically connected to the conductive rotors 428. The example of FIG. 4C is intended to illustrate that electrostatic brakes may have multiple layers.

In the example of FIG. 4C, in operation, the HV electrodes 424 and 426 are electrostatically attracted to the conductive rotors 428. The multiple layers of the brakes 1 and 2 (respectively including the HV electrodes 424 and 426) each provide braking forces. Brake 1 and Brake 2 are rectangular or wedge-shaped brakes arranged around the circumference of the conductive rotors 428. Each brake is constructed as a strip with an electrode sandwiched between a thin dielectric and thick dielectric. The strip is folded into multiple layers and, when operationally configured, the thin side faces the conductive rotors 428. The thin dielectric is selected for its electrical properties for applying braking forces, and the thick dielectric is selected for its mechanical properties for delivering the braking force to the motor housing. The braking force can be increased by increasing the number of layers or by making use of more of the surface area of each rotor.

Figure 4D:
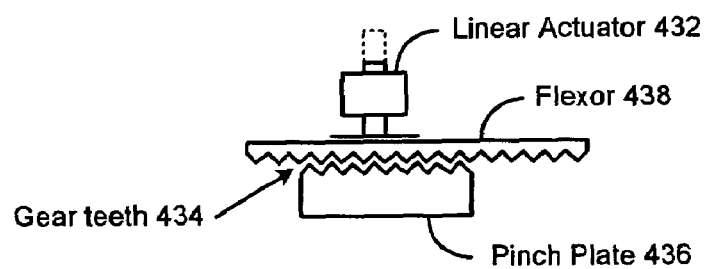

FIG. 4D depicts a motor 400D that includes a linear actuator 432, gear teeth 434, a pinch plate 436, and a flexor 438. In the example of FIG. 4D, in operation, the linear actuator 432 pushes the flexor 438 against the pinch plate 436, engaging the gear teeth 434 on the flexor 438 with the matching gear teeth 434 on the pinch plate 436. The example of FIG. 4D is intended to represent any mechanical locking brake including, but not limited to gears, inserting a pin into a matching hole, and the like. Advantageously, the force of the linear actuator 432 can be much less than the braking force. However, the flexor 438 must move in discrete steps dictated by the pitch of the gear teeth. The maximum PRatio is determined by the gear teeth pitch.

Another variation of the gear brake is to use a mechanical coupling from the driver instead of an independent linear actuator 432. The mechanical coupling works like a clock escapement to engage the driving brake during the time the driver is pinching the flexor 438 and to engage a holding brake during the time the flexor is restored to its unflexed state.

Figure 4E:
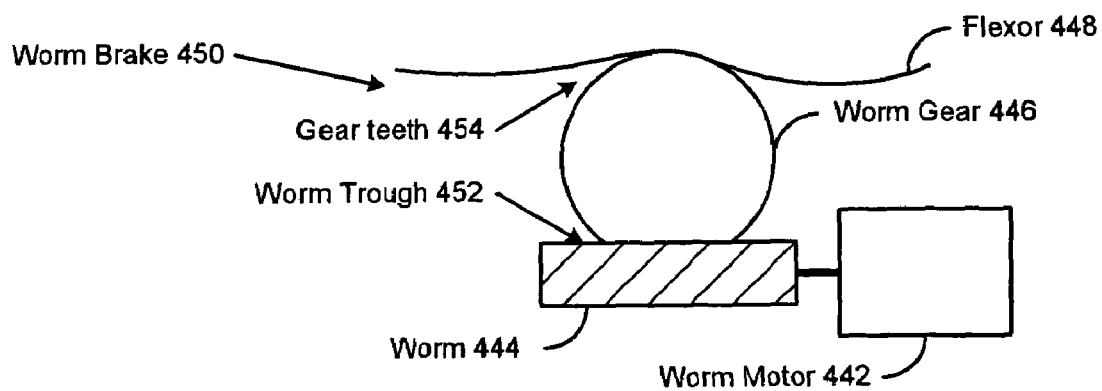

FIG. 4E depicts a motor 400E that includes a worm motor 442, a worm 444, a worm gear 446, and a flexor 448. The worm motor 442, worm 444, and worm gear 446 may be referred to collectively as the worm brake 450.

In an embodiment, the worm motor 442 drives the worm 444. The worm 444 is coupled to the worm gear 446 at a worm trough 452. As is known in the art, the worm trough 452 facilitates the engagement of a larger surface area of the worm 444 with the worm gear 446. In an alternative, the worm brake 450 does not include the worm trough 452.

In another embodiment, the worm gear 446 is coupled to the flexor 448 with gear teeth 454. As is known in the art, the gear teeth 454 facilitate the engagement of the worm gear 446 with the flexor 448. Advantageously, since the flexor 448 is flexible, the flexor 448 can conform its shape to engage a large surface area of the worm gear 446, enabling the use of small teeth (or possibly even no teeth, making use of, for example, frictional or electrostatic forces to engage the worm gear 446 with the flexor 448).

As is known in the art, most worm gears with a shallow lead angle are not back-drivable. In other words, if an external force attempts to rotate the worm gear 446, it will not cause the worm 444 to rotate. Hence, in an embodiment, when the worm 444 is stopped, the worm gear 446 is also stopped.

When the worm motor 442 is running and there is little blocking force, the worm gear 446 rotates clockwise or counter clockwise based on the rotation direction of the worm 444. If the worm gear 446 has an external load force blocking the movement, the worm motor 442 may not have sufficient torque to drive the load and the worm motor 442 may stall when driving the flexor 448 against the load, leaving worm gear 446 stopped (braked). Then, when a driver (see, e.g., FIGS. 3A to 3F) flexes the flexor 448, the pressure on the worm gear 446 is released, allowing the worm motor 442 to advance the worm gear 446 by a (typically) small amount. In this way, the worm motor 442 and the worm gear 446 can be used to advance the braking point a small amount each time the driver is activated.

The maximum torque of the motor 400E is largely determined by the braking force of the worm brake 450, which depends more on the material strength of the worm gear 446 than the power of the worm motor 442. An advantage of the worm brake 450 is that no timing is required to activate the worm brake 450 at a particular time relative to the activation of the driver. In an embodiment, the worm brake 450 may be constantly driven by a low current to apply a small torque in the desired direction of movement. The worm motor 442 stalls while waiting for slack in the flexor 448, at which time it is allowed to advance. The no-load speed of the worm motor 442 divided by the gear ratio of the worm drive is typically set high enough that it does not limit the speed of the motor 400E. The worm brake 450 does not, by itself, provide free movement mode. It is ideal for applications of motors needing an unpowered mode to be locked instead of free-moving.

In applications requiring free movement, the worm brake 450, or some other brake that does not have, by itself, a free movement mode, can be coupled with an appropriate clutch mechanism. For example, in applications not requiring a free movement mode or bidirectional operation, a one-way clutch can be used for the driving and holding brakes. This type of clutch, such as a ball clutch, locks a wheel to a shaft when turning one direction, but allows them to move independently when the shaft is moving the other direction. If a belted motor such as, for example, the belted motor described later with reference to FIG. 5, uses one-way clutches to implement the brakes, no active control over the brakes is required. Activating the driver to alternately bend the flexor belt on opposite sides implements a gear reduction from the driver to the output gear.

The motor 200 (FIG. 2) may be implemented using any of the braking technologies described with reference to FIGS. 4A to 4E, or using other braking technologies (not shown). Other types of brakes are known, including, for example, hydraulic and pneumatic brakes. Technologies used in clutches can also be used to implement a motor brake. As another example, electrorheological and magnetorheological fluids (e.g., fluids that change viscosity in the presence of an electric or magnetic field) may be placed in the space between plates coupled to a motor housing and a flexor. Changing the viscosity of the fluid may impart a braking force.

Figure 5:
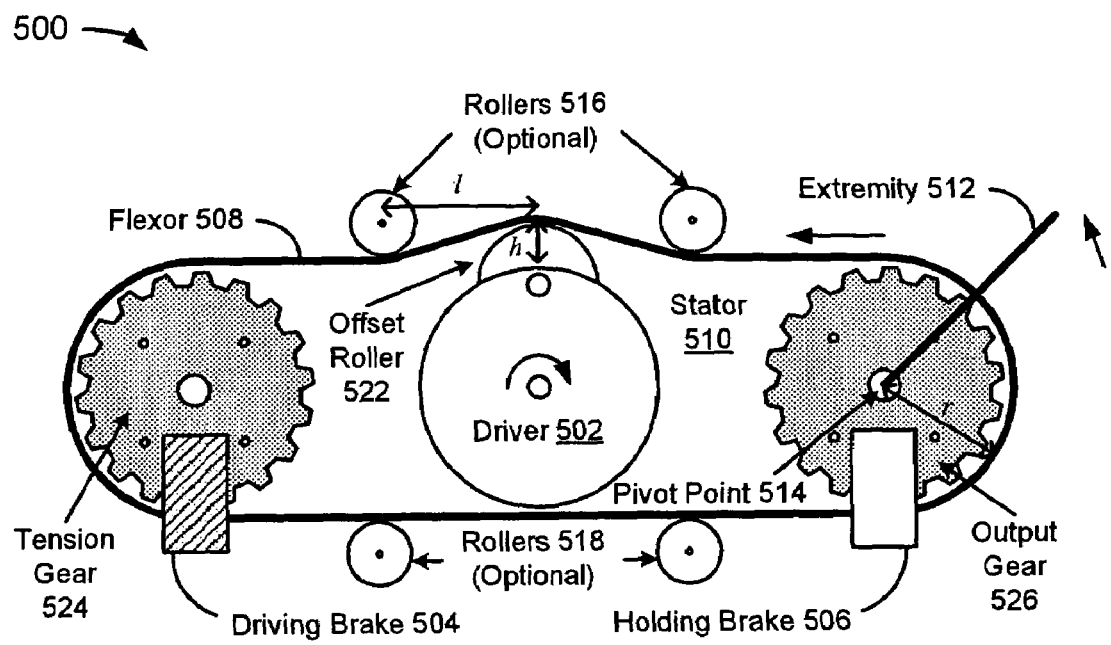
FIG. 5 depicts a conceptual diagram of a belted motor according to an embodiment.

While FIG. 2 depicts an embodiment in which the motor 200 has, for illustrative purposes only, a linear flexor 208, in other embodiments, the flexor 208 may be implemented in a belted, rotary, or other fashion. FIG. 5 is intended to show a belted flexor implementation. FIG. 5 depicts a conceptual diagram of a belted motor 500 according to an embodiment, utilizing a driver 502 that includes an offset roller (see, e.g., FIG. 3E), brakes 504 and 506 that are offset with respect to the driver 502 (see, e.g., FIGS. 4A to 4E), and a belt that includes a flexor 508.

The belted motor 500 includes the driver 502, driving brakes 504, holding brakes 506, the flexor 508, rollers 516, rollers 518, an offset roller 522, a tension gear 524, and an output gear 526. The driver 502, driving brakes 504, holding brakes 506, rollers 516, rollers 518, offset roller 522, tension gear 524, and output gear 526 may be collectively referred to as the stator 510. An extremity 512 and pivot point 514 are also depicted for illustrative purposes.

The flexor 508 may be implemented as the belt or may be attached to the belt via mechanical or other means. For the purposes of example, if FIG. 5, the flexor 508 and the belt are the same component (i.e., the belt is used as the flexor 508). The belt delivers force to an output gear coupled to the load. In the following discussion, a timing belt and timing gears are described, but the same type of motor could be designed using a chain or V-belt. Note that unlike the typical uses for timing belts, the pitch of the gear teeth is of little consequence here because the drive ratio is dependent on the amount the belt is deflected, not the relative number of teeth on the gears.

In operation, the flexor 508 engages the teeth of the tension gear 524 and the output gear 526, but the length of flexor 508 is slightly longer, leaving enough slack in the belt to allow the flexor 508 to be deflected by the driver 502. The driving brake 504 acts to stop the tension gear 524 and the holding brake 506 acts to stop the output gear 526.

It may be noted that the description of this and subsequent figures is for counter-clockwise motion of the output gear 526. Clockwise motion is performed in a complementary fashion by reversing the functions of the brakes, making the right brake the driving brake and the left brake the holding brake.

In the example of FIG. 5, the driver 502 is depicted as a motor driving the offset roller 522, but the belted motor 500 can be implemented with any of the driver technologies previously discussed, such as, for example, the driver technologies described with reference to FIGS. 3A to 3F. Each brake 504, 506 is shown simply as a rectangle which is shaded when active and white when inactive. These rectangles are intended to represent any of a number of braking technologies, including, for example, those discussed with reference to FIGS. 4A to 4E.

The belted motor 500 operates by sequencing the brakes 504, 506 as the driver 502 moves to pinch the flexor 508 with the offset roller 522. The driving brake 504 is activated when the driver 502 moves to deflect the top part of flexor 508 in order to move the output gear 526 counter-clockwise. After the movement has been completed, the holding brake 506 is activated to keep the load from pulling the output gear 526 clockwise, and during the time the holding brake 506 is active, the driver 502 deflects the bottom of flexor 508 to move the tension gear 524 counter-clockwise and to restore the top part of flexor 508 to its flat position in preparation for the next cycle.

The PRatio equals the average rotational speed of driver 502 divided by the average rotational speed of output gear 526. So, the average torque applied to a load is the average torque of the driver 502 times the PRatio.

In addition, for the output gear 526 to rotate once, the belt must move a distance of $2\pi r$. With each rotation of the driver 502, the flexor 508 moves by the difference in the arc length in the deflected position and the flat position. The deflected position approximately forms two right triangles with short side h, and long side l, where l is half the difference between the axis of the rollers 516 (or the distance between the axis of the tension gear 524 and the output gear 526 in the case where the optional rollers 516 are omitted). Accordingly, the distance traveled by the belt on each revolution is twice the difference between the hypotenuse and the long side of the triangle. The PRatio is computed as the ratio of the circumference of output gear 526 and the movement caused by each revolution of the driver 502. Hence, the equation for the PRatio is:

$$PRatio = \frac{2\pi \cdot r}{2 \cdot (\sqrt{h^2 + l^2} - l)} = \frac{\pi \cdot r}{\sqrt{h^2 + l^2} - l}$$

TABLE 1

Pinch ratio vs. h for one value of r and l

| r | 1.5 |
|---|---|
| l | 1 |

| h | PRatio |
|---|---|
| 0.1 | 945 |
| 0.2 | 238 |
| 0.3 | 107 |
| 0.4 | 61 |
| 0.5 | 40 |
| 0.6 | 28 |

Table 1 shows how the PRatio varies for some values of r, l and h when each variable is measured in the same units of distance (e.g. inches or cm). For very small deflections of the flexor 508, the PRatio grows relatively large. In the example of Table 1, where r=1.5 and l=1, the PRatio can vary from 945 to 28 by changing l, the displacement of the driver 502, from 0.1 to 0.6. Thus, it is possible to achieve a wide range of mechanical advantage by varying the displacement of the driver 502. Changing the time when the driving brake 504 is applied may have a similar effect to changing the driver displacement. Hence the mechanical advantage can be controlled through a change in the timing of the phases that control the timing of the driver 502 and brakes 504, 506.

The PRatio equation above assumes that the brakes, belt, and motor housing are all ideal. In an ideal belt motor, the brakes do not slip, the belt does not stretch, the housing is perfectly rigid, and the restoring phase completely flattens out the belt to prepare for each subsequent driver activation. In any real implementation, as the displacement l approaches zero, one of these effects will probably limit the maximum PRatio. These terms together can be modeled with a new slip variable, s, that sums all potential backwards motion on each revolution of the driver 502. With this new term added, the PRatio equation becomes:

$$PRatio = \frac{\pi \cdot r}{\sqrt{h^2 + l^2} - l} - s$$

TABLE 2

The effect of slip on PRatio for several values of h.

| r | 1.5 |
|---|---|
| l | 2 |

| | | | s | | | |
|---|---|---|---|---|---|---|
| h | 0 | 0.001 | 0.002 | 0.004 | 0.008 | 0.016 |
| 0.1 | 1886 | 3145 | 9454 | −3138 | −857 | −349 |
| 0.2 | 472 | 525 | 591 | 789 | 2386 | −782 |
| 0.3 | 211 | 220 | 231 | 256 | 328 | 739 |
| 0.4 | 119 | 122 | 125 | 132 | 149 | 200 |
| 0.5 | 77 | 78 | 79 | 82 | 88 | 103 |
| 0.6 | 54 | 54 | 55 | 56 | 59 | 65 |

In the example of Table 2, where r=1.5 and l=1, when slip, s, increases to 0.004 and beyond, PRatio becomes negative for small values of h, indicating that the forward movement made by pinching the flexor is less than the reverse movement due to slip. Hence, the maximum PRatio and maximum torque of the belted motor 500 is determined largely by the quality of the brakes and stiffness of the housing. When using brakes with gear teeth, the pitch of the teeth is part of the slip, and very fine teeth are desirable to have a large PRatio.

In the example of FIG. 5, the rollers 516, 518 are optional. In an embodiment, the rollers 516, 518 are coupled to a pinch plate (not shown), and the brakes 504, 506 pinch the flexor 508 against the pinch plate at various stages of operation. Multiple operation states, regardless of whether the rollers 516, 518 are used, are illustrated with reference to FIGS. 6A to 6D.

Figure 6A:
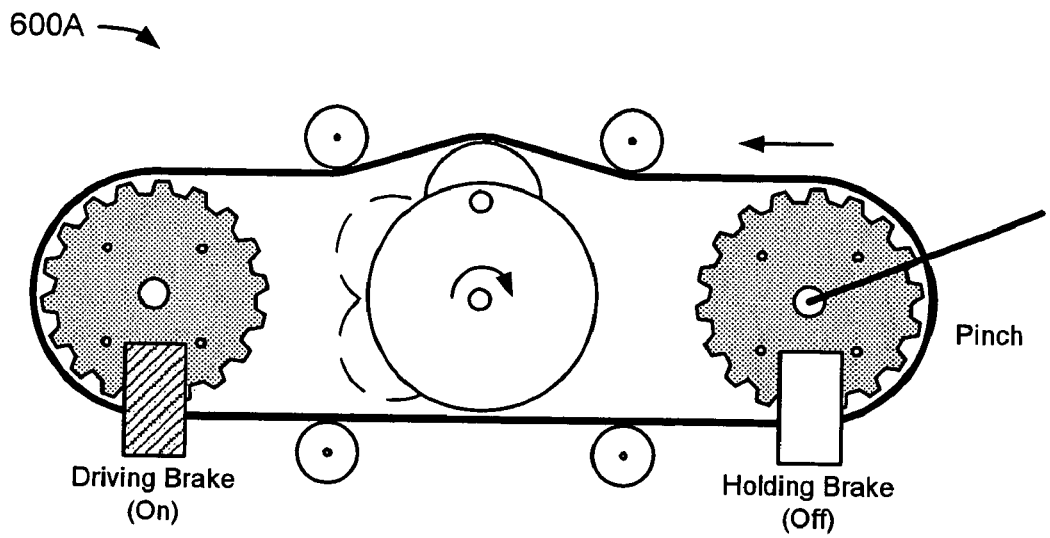
FIGS. 6A to 6D depict conceptual diagrams of a belted motor in multiple operation states according to an embodiment.

FIGS. 6A to 6D depict conceptual diagrams of the belted motor 500 (FIG. 5) in multiple operation states according to an embodiment. FIG. 6A is intended to illustrate a "pinch phase" in which the driving brake 504 is engaged and the driver 502 rotates to pinch the flexor 508 and move the output gear 526 counter-clockwise.

Figure 6B:
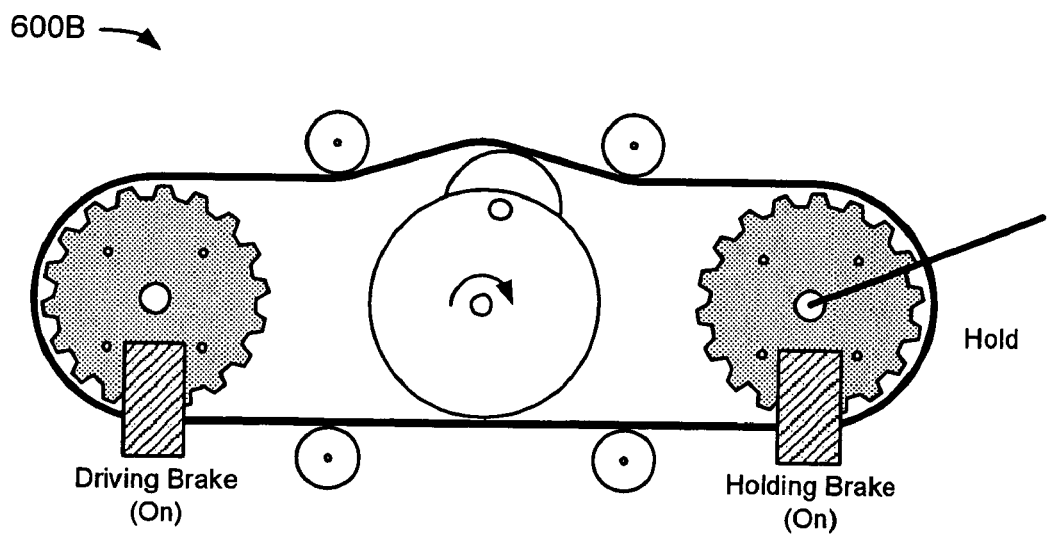

FIG. 6B is intended to illustrate a "hold phase" at a point in time just after the maximum deflection of the flexor 508 has been reached. At this point, in an embodiment, both the driving brake 504 and the holding brake 506 are on. Both brakes are on briefly in order to make sure there is no point in time when the load could pull holding gear 526 backwards. In an alternative, the brakes are not simultaneously engaged if the load would not pull the holding gear 526 backwards.

Figure 6C:
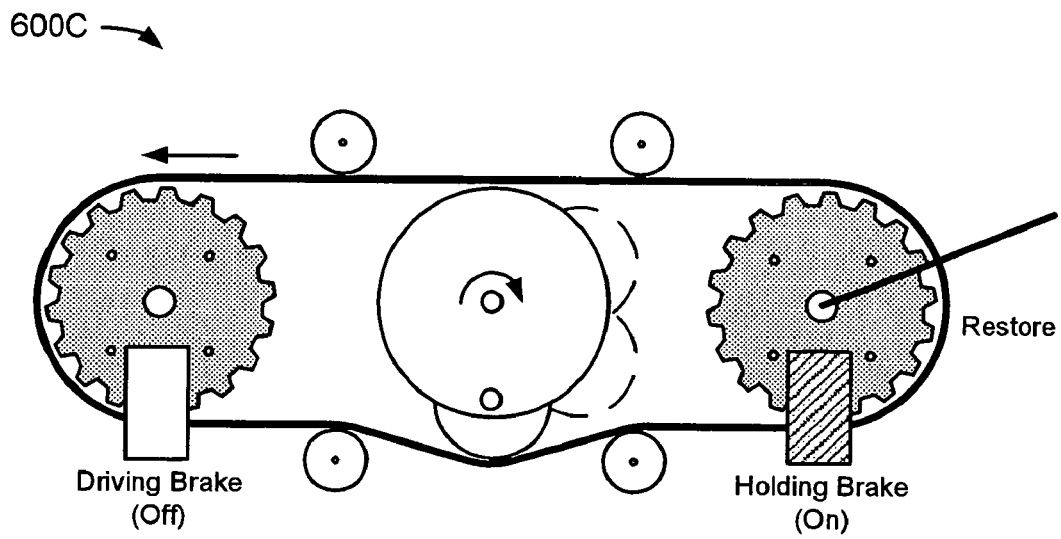

FIG. 6C is intended to illustrate a "restore phase" in which the holding brake 506 is active, the drive brake 504 is inactive, and the driver 502 is rotating to pull the slack out of the top part of the belt and restore it to its flattened position. In an embodiment, during the restore phase, the tension gear 524 rotates counter-clockwise.

Figure 6D:
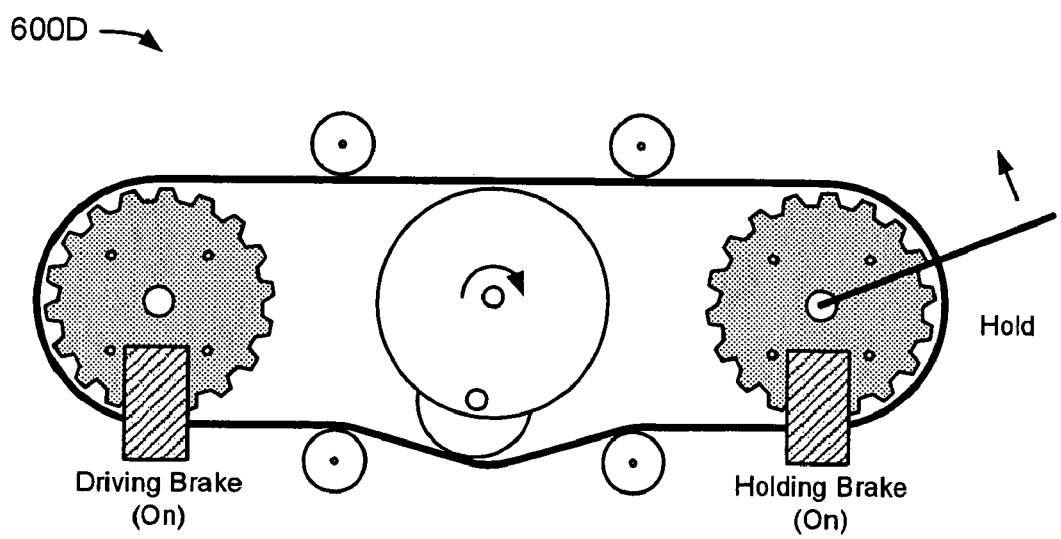

FIG. 6D is intended to illustrate a "hold phase" that follows the restore phase. In this hold phase, both brakes are briefly engaged to hold the flexor in position in preparation for the next cycle. In an embodiment, each cycle includes the pinch phase (see, e.g., FIG. 6A) and a restore phase (see, e.g., FIG. 6C), with, in an embodiment, intervening hold phases (see, e.g., FIGS. 6B and 6D).

It should be noted that reverse direction movement, in which the right brake serves as the driving brake and the left brake serves as the holding brake, is possible by turning the gears in a clockwise direction (instead of a counter-clockwise direction). The reverse direction movement would include states (e.g., pinch phase, restore phase, and hold phase) comparable to those described with reference to FIGS. 6A to 6D.

In an embodiment, another state, in which both the driving brake 504 and the holding brake 506 are disengaged, allows free movement of the tension gear 524 and the output gear 526. If an external force is applied to the output while in this free movement mode, the output gear 526 moves freely, thereby moving the flexor 508 and the tension gear 524. In an embodiment, the motor controller can switch between free movement mode, forward movement mode, and reverse movement mode by controlling the activation of the two brakes.

Figure 7A:
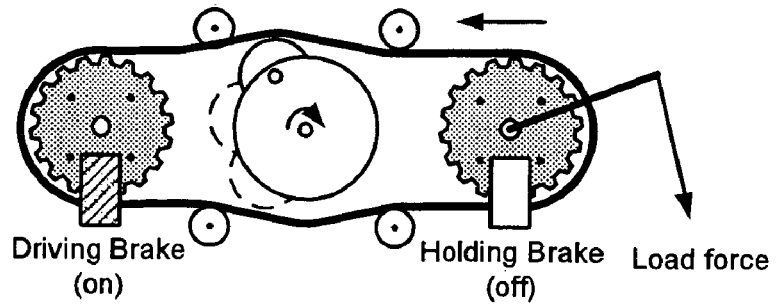
FIGS. 7A to 7F depict conceptual diagrams of belted motors operating at high torque in multiple operation states according to an embodiment.

The maximum torque of a motor according to an embodiment is determined by the smaller of the force exerted by the brakes and the force supplied by the driver times the PRatio. When the driver 502 is rotary, as the load increases, there is a point where there is no longer enough driver torque to deflect the flexor 508 enough to allow a full rotation of the driver 502. At that point, if the driving brake 504 is still active, the driver 502 would likely stall. However, before the stall occurs, the driving brake 504 can be released as described below with reference to FIGS. 7A to 7F FIGS. 7A to 7F depict conceptual diagrams of the motor 500 (FIG. 5) operating at high torque in multiple operation states according to an embodiment. FIG. 7A is intended to illustrate a position where the maximum torque setting is reached (at less than maximum pinch). The maximum torque can be determined based on the back-EMF of the motor, the total current draw, a position sensor, or some other feedback system.

Figure 7B:
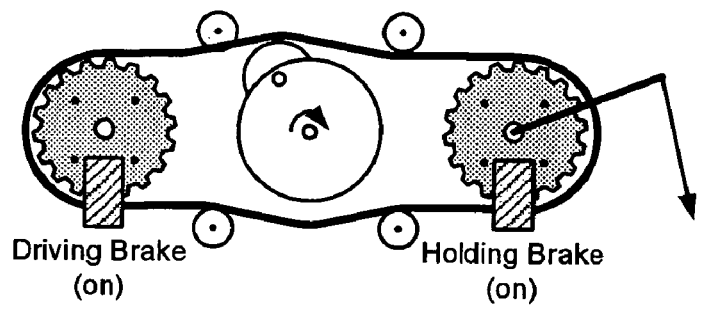

FIG. 7B is intended to illustrate a holding phase after reaching maximum torque. In this holding phase, the holding brake 506 may be activated. The driving brake 504 may remain activated for a period of time, resulting in both the driving brake 504 and the holding brake 506 being engaged.

Figure 7C:
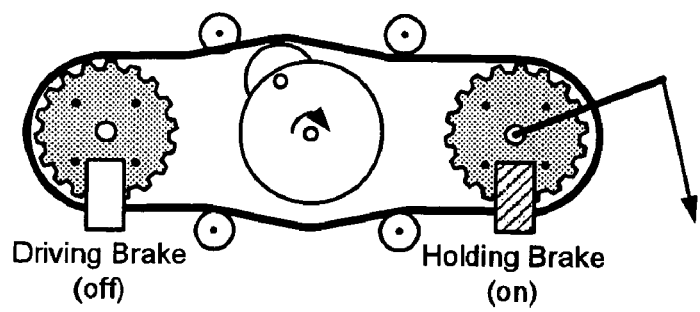

FIG. 7C is intended to illustrate a first part of a "free belt phase" in which, once the holding brake 506 is fully engaged, the driving brake 504 is released to free the belt. During the free belt phase, the driving brake 504 is off when the holding brake 506 is on and the tension gear 524 may move clockwise (e.g., backwards from its normal direction), allowing slack in the flexor 508. Because there is slack in the flexor 508, the driver 502 should not be prevented from reaching its maximum deflection position.

Figure 7D:
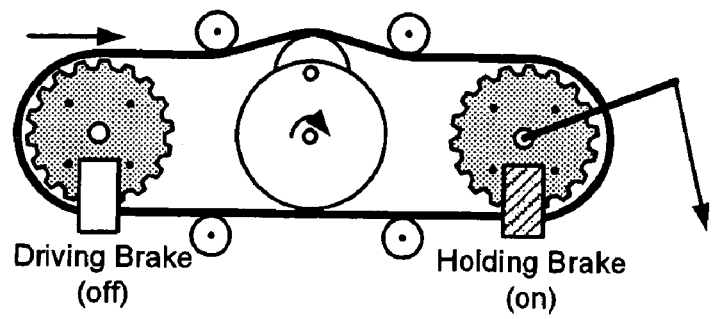

FIG. 7D is intended to illustrate a second part of the free belt phase. In the second part of the free belt phase, with the driving brake 504 released the driver 502 may be able to move to its maximum deflection position without being inhibited by the load force. In the example of FIG. 7D, the maximum deflection position is represented by having the offset roller 522 in a vertical position under the flexor 508.

Figure 7E:
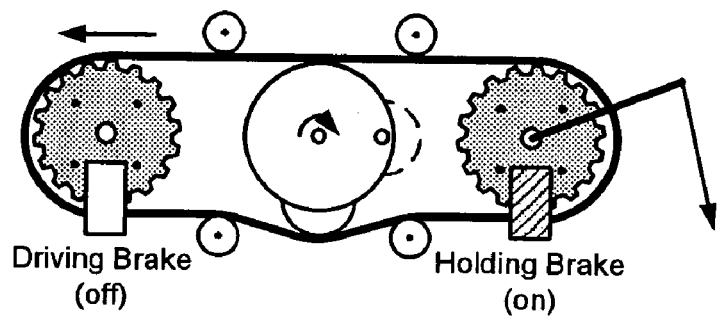

FIG. 7E is intended to illustrate a third part of the free belt phase, wherein the holding brake 506 remains engaged as the driver 502 rotates through. During the third part of the free belt phase, the tension gear 524 reverses and moves counter-clockwise. This third part of the free belt phase may also be referred to as a restore phase because the driver 502 is rotating to pull the slack out of the top part of the belt and restore it to its flattened position.

Figure 7F:
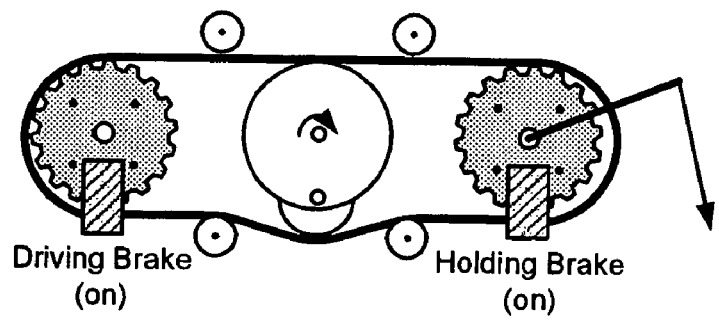

FIG. 7F is intended to illustrate a hold phase, in which both brakes are engaged, in preparation for a next pinch phase. In an embodiment, each cycle includes the pinch phase (see, e.g., FIG. 7A) and the free belt phase (see, e.g., FIGS. 7C, 7D, and 7E), with, in an embodiment, intervening hold phases (see, e.g., FIGS. 7B and 7F). By controlling the timing of the brakes, in an embodiment, the driver 502 can be prevented from stalling and the motor torque can be limited to a desired value.

Figure 8A:
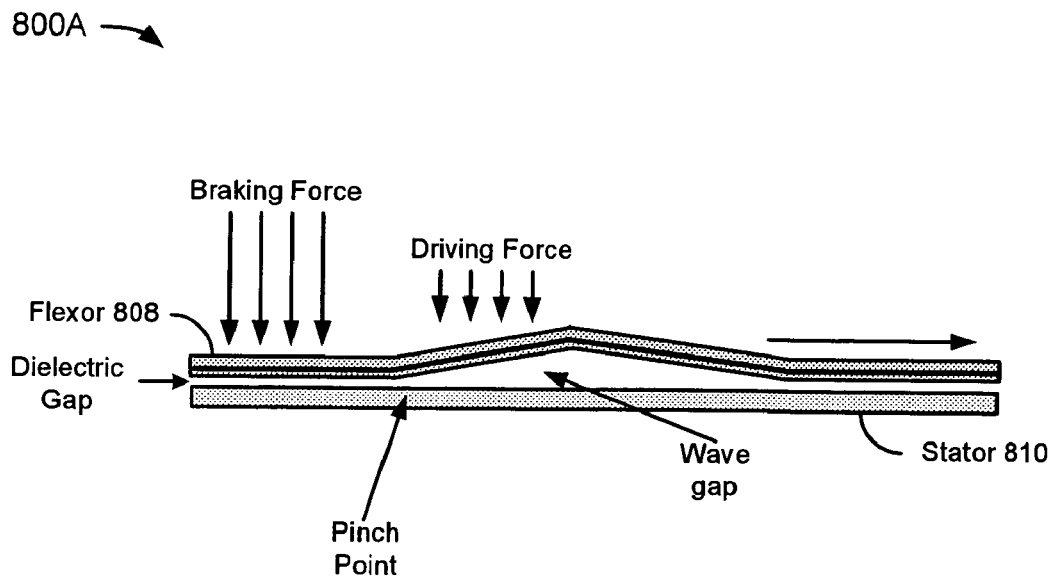
FIGS. 8A and 8B depict conceptual diagrams of forces on a motor according to respective embodiments.
Figure 8B:
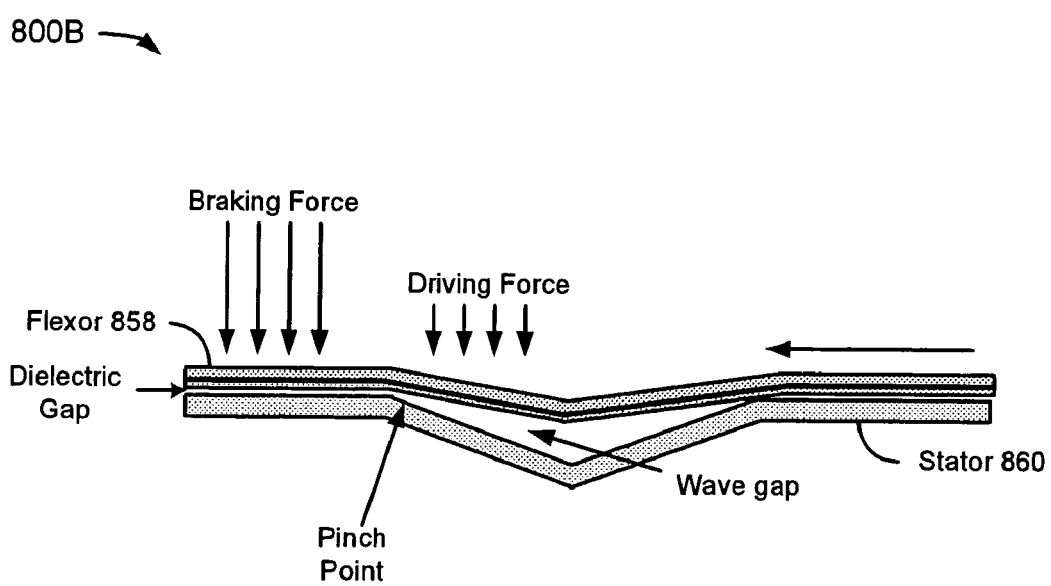

FIGS. 8A and 8B depict conceptual diagrams of motors according to respective embodiments. FIG. 8A is intended to illustrate forces for a driver and brake in a conical motor 800A, which includes a flexor 808 and a stator 810. The flexor 808 has a longer circumference than the stator 810, and when they are clamped together at two places, the flexor 808 forms a hill with wave gap separating the flexor 808 from stator 810. When the driver, which in the example of FIG. 8A is an electrostatic force, pushes the flexor 808 towards stator 810 with one portion clamped by a driving brake, which in the example of FIG. 8A is also an electrostatic force, the free portion of the flexor 808 is pushed away from driving brake.

FIG. 8B is intended to illustrate forces for driver and brake in a wavy motor 800B, which includes a flexor 858. The wavy motor 800B is constructed with a stator 860 that has a wedge of material added (instead of a wedge of material subtracted, as with the conical motor 800A). The stator 860 can be formed into some number of hills and valleys (waves). The more waves that are formed, the lower the amplitude of each wave, but the total arc length traversed by a pinch point can be kept the same.

FIG. 8B illustrates the forces for one driver in the wavy motor 800B. The flexor 858 has a shorter circumference than motor 860, and a wave gap is formed in the valley of the stator 860 underneath the flat flexor 858. When the driver pulls the flexor 858 towards the stator 860 with one portion clamped by a driving brake, the free portion of the flexor 858 is pulled toward the driving brake. A sequence of hills and valleys is repeated around the circumference of the stator 860. When the flat flexor 858 is pinched to the wavy stator 860 and the pinch point is moved around the stator 860 once, the rotor moves in the opposite direction as the pinch point.

In the wavy motor 800B, the flexor 858 is pulled toward the stator 860, whereas in the conical motor 800A, the flexor 808 was pushed away from the stator 810. The wavy motor 800B hence may have an advantage because the flexible material is in tension instead of compression, and it may be able to couple higher forces.

The wavy design has another advantage over the conical design because the number of waves can be increased in order to decrease the amplitude of each wave. This is particularly important when using drivers whose force decreases sharply with increasing distance. For instance, using electrostatic drivers, the magnitude of the pinching force is governed by the equation:

$$F = \frac{\varepsilon_0 \varepsilon_r A V^2}{2h^2},$$

where $\varepsilon_0$ is the permittivity of free space ($8.854 \times 10^{-12}$ coulomb per volt-m), $\varepsilon_r$ is the relative dielectric constant of the insulating material (e.g., 1 for air and 3.4 for a typical insulating material such as polyimide), A is the area of the plates, V is the voltage between the conductive plates (typically in the range of 1 KV to 4 KV), and h is the spacing between the plates.

This equation shows the importance of decreasing the spacing between the plates, because the force goes up by a factor of 4 each time the distance is halved. In an embodiment, the design does not require any extra spacing for lubrication. When the plates have both an air gap and an insulator, the force depends on the height of the air gap, the height of the insulator, and the dielectric constant of the insulator.

Figure 9A:
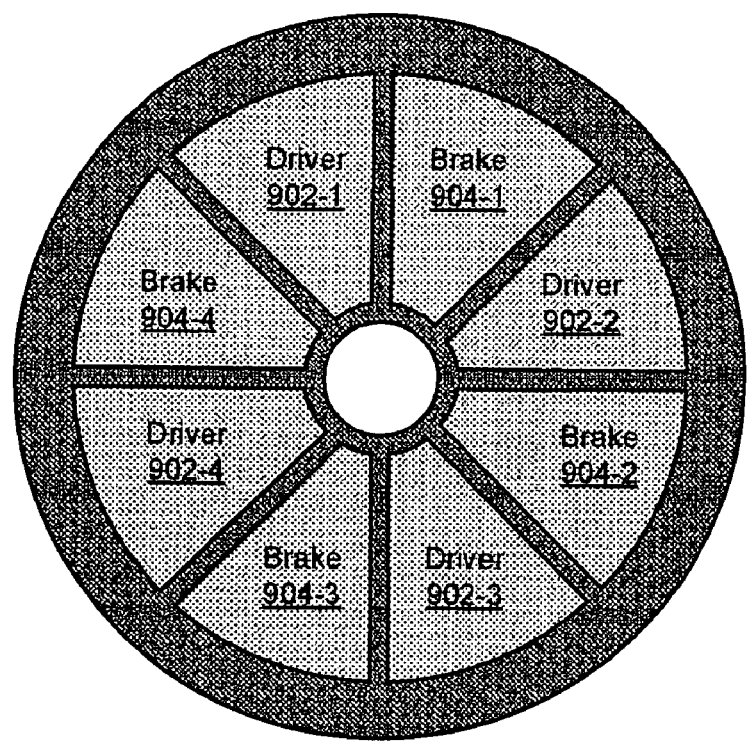
FIGS. 9A and 9B depict conceptual diagrams of a motor according to an embodiment.
Figure 9B:
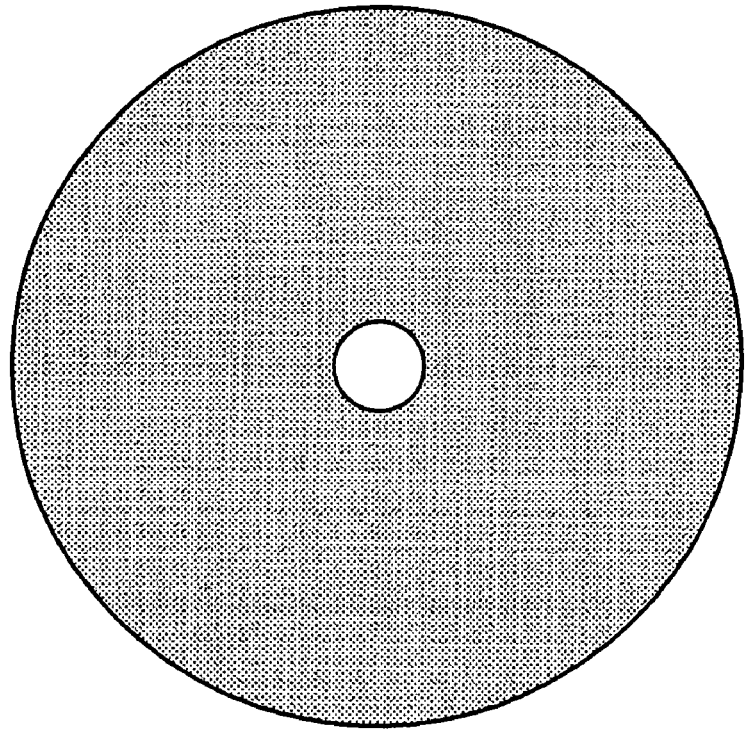

FIGS. 9A and 9B depict conceptual diagrams of a rotary motor according to an embodiment. FIG. 9A depicts a stator 910 with four drivers 902-1 to 902-4 (collectively referred to hereinafter as the drivers 902) and four brakes 904-1 to 904-4 (collectively referred to hereinafter as the brakes 904). The drivers 902 and brakes 904 may be of any type.

FIG. 9B depicts a flexor 908, which may include a disk made of a flexible conductive material such as, for example, conductive Kapton film, carbon-filled polycarbonate, or a polymer coated with a conductive ink. The flexor 908 may be connected to ground or common voltage. In an embodiment, the path for this connection is from the motor housing through a conductive bearing and shaft and finally to the flexor 908. High voltage phases are applied to the brakes 904 of the stator 910, and they attract the flexor 908 through a thin dielectric layer between the high voltage brake electrodes (not shown) and the flexor 908.

In the rotary motor, a flexible disk serves as the rotor with the drivers 902 and brakes 904 arranged around the periphery. The drivers 902 are sequenced in a way that a pinch point moves around the circle, and on each advance, a brake that was functioning as a holding brake becomes a driving brake. By arranging the drivers 902 in a circle, the driving force applied to the flexor 908 at one driver also becomes the restoring force to flatten the flexor 908 at the points where drivers 902 are inactive.

The shape formed by the flexor 908 when drivers are activated is more complex than in the linear case. There are several options for the design of the stator 910 that should be apparent from the teachings provided herein.

A way to understand a principle of operation of the rotary motor depicted in the example of FIGS. 9A and 9B, is to imagine two disks cut out of a thin sheet plastic or paper. One disk, the stator, has a small wedge cut from it and the ends are joined together to form a cone. A pin connects the center of the stator cone to the center of the flexor disk. The disk and cone are pinched together at one point around the outer diameter and a mark is made on both the cone and disk near the points where they touch. If the disk and cone are pinched together at successive pinch points around the circumference, when the pinch point has traveled all the way around once, the marks on the cone and disk will be displaced by a distance equal to the amount of wedge that was previously cut from the cone. Hence the (flexor) disk has advanced a distance relative to the (stator) cone, and the amount of advancement depends on the arc length difference at the radius of the circle formed by the sequence of pinch points. The difference in arc length divided by the total circumference is the mechanical advantage, or PRatio. If the diameter of the disk is about 3.2 inches, then the circumference at the outer diameter is 10 inches. If the pie-shaped cutout was 0.1 inch at the outer diameter, then the pinch point needs to travel around 100 times (10/0.1) in order for the rotor to rotate back to its original position. This design has a PRatio of 100:1 with the rotor advancing in the same direction as the pinch point.

Figure 10A:
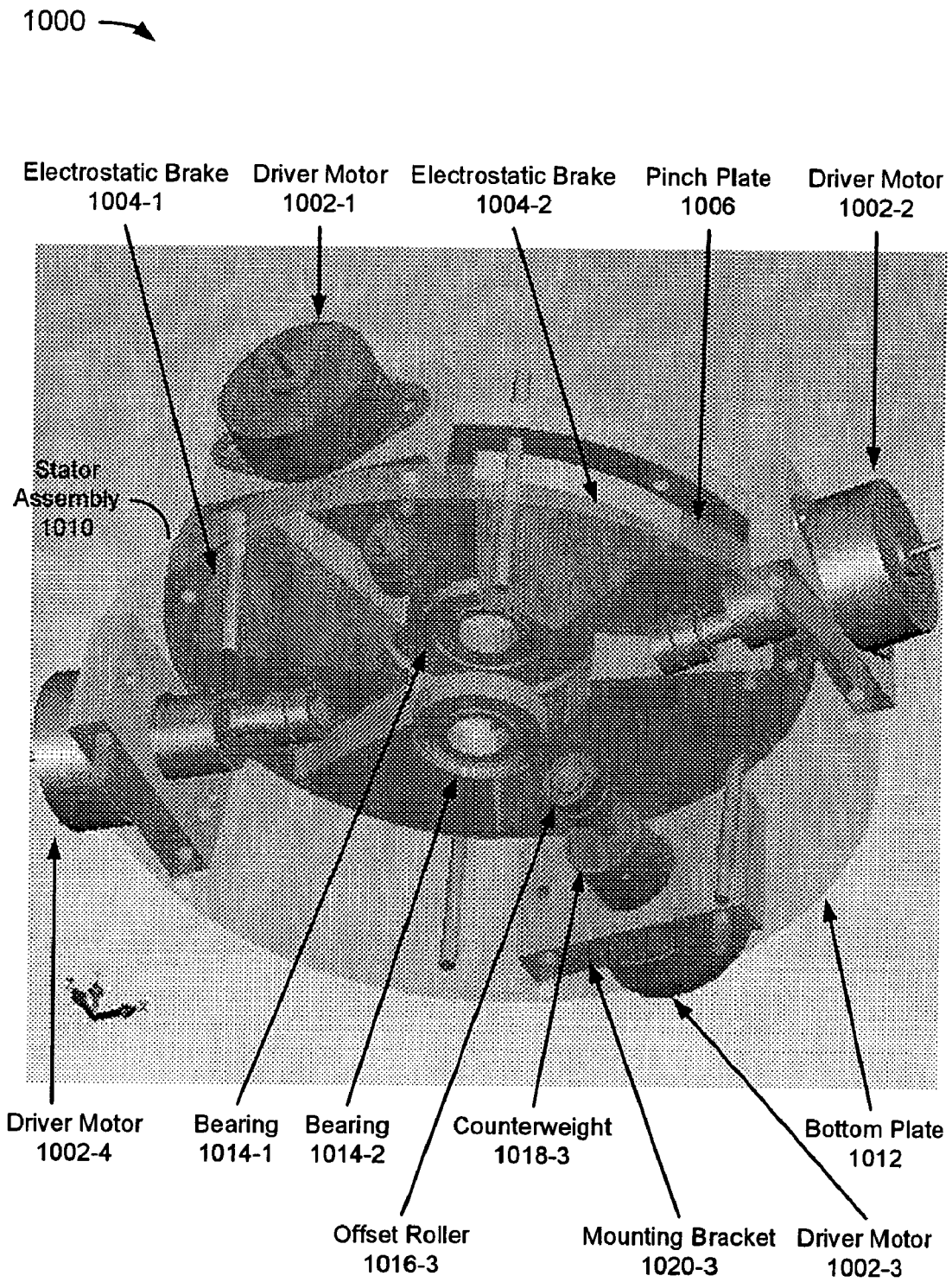
FIGS. 10A and 10B depict drawings of a rotary motor according to an embodiment.
Figure 10B:
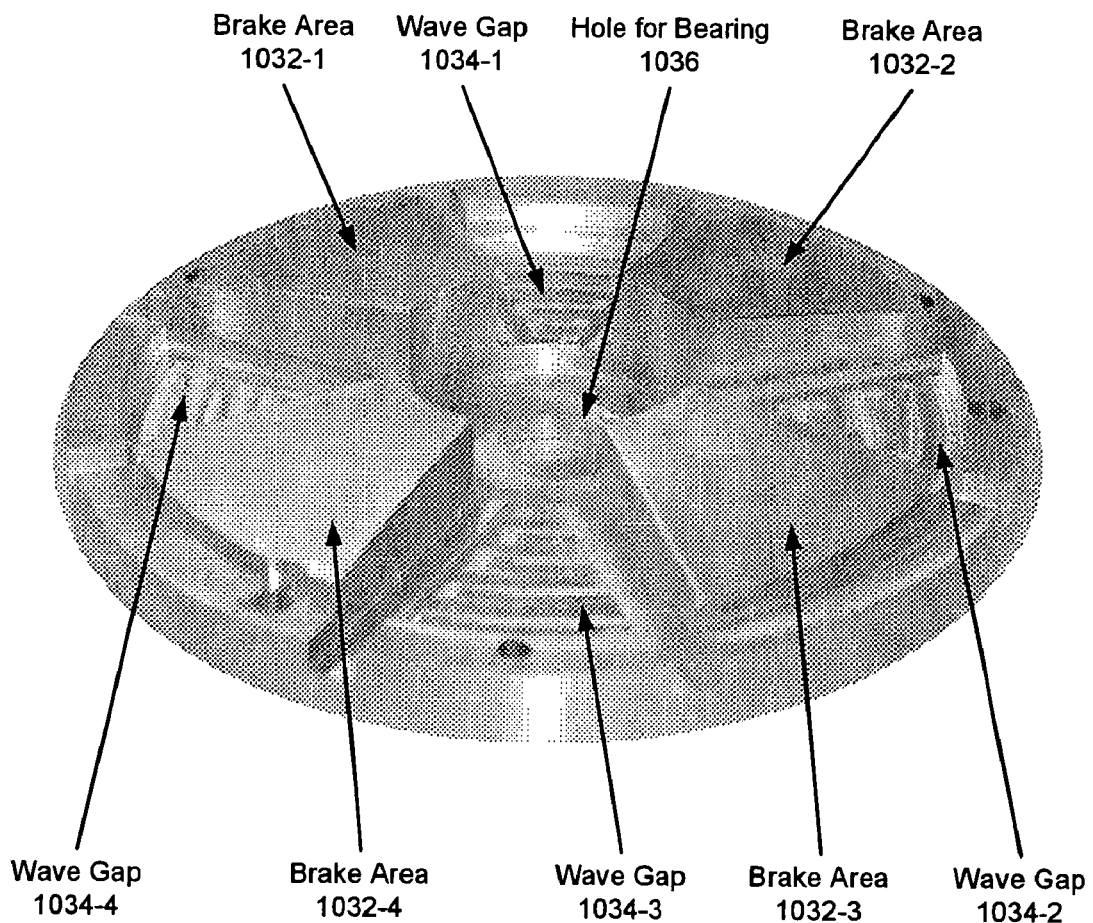

FIGS. 10A and 10B depict drawings of a rotary motor 1000 according to an embodiment. As depicted in the example of FIG. 10A, the rotary motor 1000 includes driver motors 1002-1 to 1002-4 (collectively referred to hereinafter as the drivers 1002) with respective offset rollers 1016-1 to 1016-4 (collectively referred to hereinafter as the offset rollers 1016) and counterweights 1018-1 to 1018-4 (collectively referred to hereinafter as the counterweights 1018), electrostatic brakes 1004-1 to 1004-4 (collectively referred to hereinafter as the brakes 1004), a pinch plate 1006, a bottom plate 1012, and top and bottom bearings 1014-1 and 1014-2 (collectively referred to hereinafter as the bearings 1014).

The components depicted in the example of FIG. 10A may be referred to collectively as the stator assembly 1010. The drivers 1002 are mounted to the bottom plate 1012 via respective mounting brackets 1020-1 to 1020-4 (collectively referred to hereinafter as the mounting brackets 1020). In an embodiment, a motor shaft (not shown) may pass through the bearings 1014, and a flexor disk (not shown) may be coupled to the shaft between the offset rollers 1006 and the pinch plate 1016. In the example of FIG. 10A, the brakes 1004 are electrostatic and the drivers 1002 are motors with offset rollers 1016.

In operation, the drivers 1002 drive their respective offset rollers 1016, which pinch the flexor against the pinch plate 1006 once per revolution. The counterweights 1018 compensate for the weight of the respective offset rollers 1016 to move the center of mass in line with the motor shaft.

FIG. 10B depicts a pinch plate 1006 for use with the rotary motor 1000 (FIG. 10A). In the example of FIG. 10B, the pinch plate 1006 includes wave gaps 1032-1 to 1032-4 (collectively referred to hereinafter as the wave gaps 1032), brake areas 1034-1 to 1034-4 (collectively referred to hereinafter as the brake areas 1034), and a hole for bearing 1036.

In operation, one of the drivers 1002 pinches the flexor into one of the corresponding wave gaps 1032. The wave gaps 1032 should be deep enough that the drivers 1002 can fully extend when pinching the flexor and do not bottom out. It may be noted that in the drawing of FIG. 10B, the bottom of the wave gaps 1032 appear to have concentric rings, but these are just tooling marks and do not necessarily serve a function.

The shape of pinch plate 1006 may be relatively complex. The brake areas 1034 are not flat, but instead slope downward. In an embodiment, this shape is cut by first machining the pinch plate 1006 into a cone, then cutting the deep wave gaps 1032. The angle of the cone is determined by the number of drivers 1002 that will be simultaneously active, two in the case of the rotary motor 1000, and by the maximum travel of each driver 1002. When the active drivers are in their fully extended position, the flexor may be pinched into the corresponding wave gaps but pulled tightly across the wave gaps of the inactive drivers, and pulled tightly across the brakes 1004. If the cone angle is too shallow or flat, the circumference of the flexor may not be large enough to be pushed into the wave gaps of the active drivers. If the cone angle is too steep, then when the drivers 1002 are active, the rest of the flexor is too loose and there is no restoring force to pull the flexor out of the wave gaps of the previously active drivers. When the cone angle is too steep, the flexor can completely follow the contours of the pinch plate 1006 and the drivers 1002 are free to rotate without imparting any force to the flexor.

Accordingly, in an embodiment, the pinch plate 1006 is not purely wavy or purely conical, but is a combination of both. A purely wavy pinch plate may require that the flexor be constructed of an elastomer in order for the drivers 1002 to be able to push it into the wave gaps 1032. Such a motor may not be ideal from an efficiency standpoint because energy is lost in continually stretching and relaxing the flexor material. A purely conical pinch plate may be functional as well, but has the previously discussed drawback that the output shaft is pushed, rather than pulled, by the flexor. Therefore, the conical design may not be able to couple as much force as a design that incorporates both wavy and conical aspects (e.g., a wavy conical pinch plate).

The wavy conical pinch plate functions as a type of wavy pinch plate with the output rotation direction opposite to the pinch rotation direction. The proper choice of cone angle may obviate the need for either an elastic rotor or for additional mechanisms to perform the restoring step to pull the flexor back out of the wave gaps. As the pinch point moves around, the activation of a set of drivers performs the restoring step on the part of the flexor under the inactive drivers.

FIGS. 10A and 10B depict a rotary motor with four drivers and four brakes; however, in alternative embodiments, rotary motors may be constructed with different numbers. A rotary motor constructed according to techniques described herein has at least two drivers and two brakes because each driver activation pinches the flexor under one driver and restores it under the other driver. The number of drivers can be increased without bound within the physical constraints of the other components. In the rotary design, the number of brakes may be the same as the number of drivers.

Figure 11A:
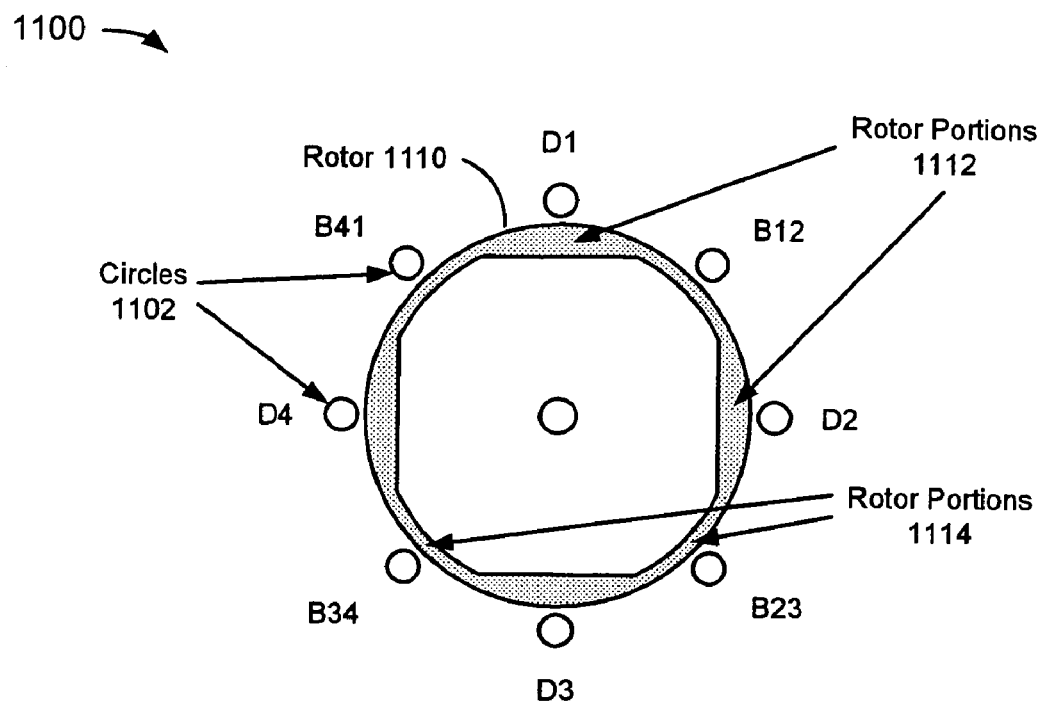
FIGS. 11A to 11D depict conceptual drawings of a rotary motor in multiple states of operation according to embodiments.

FIGS. 11A to 11D depict conceptual drawings of a rotary motor in multiple states of operation according to embodiments. FIG. 11A depicts a rotary motor 1100 with drivers denoted D1 to D4, arranged clockwise around the circumference of a rotor 1110. Brakes are denoted B12, B23, B34, and B41, where the numeric portion represents the nearest drivers; for instance, B12 is between D1 and D2. Each driver and each brake has an associated circle 1102. Beneath the circle of each driver, on the rotor 1110, is a rotor portion 1112. Beneath each circle of each brake, on the rotor 1110, is a rotor portion 1114.

Figure 11B:
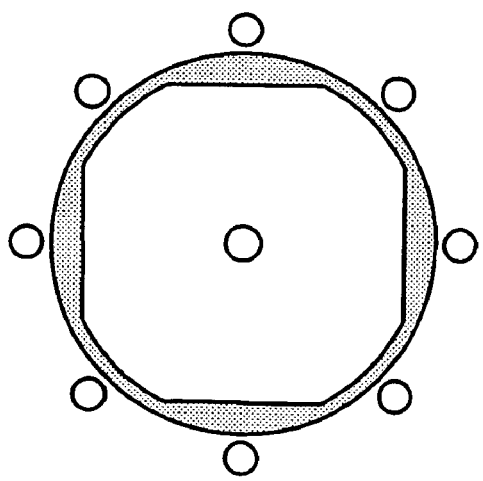
Figure 11C:
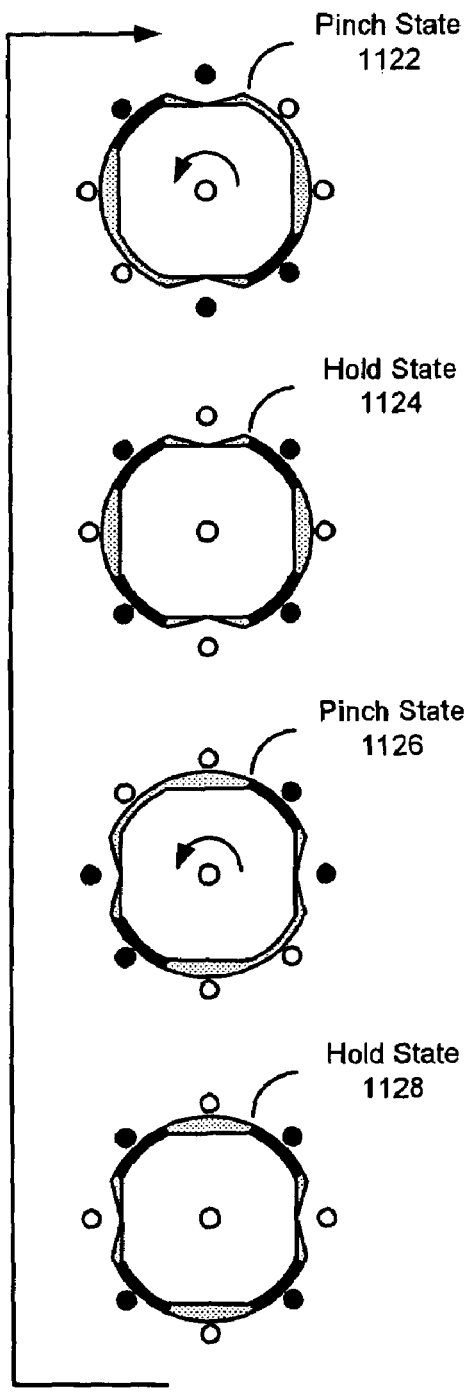
Figure 11D:
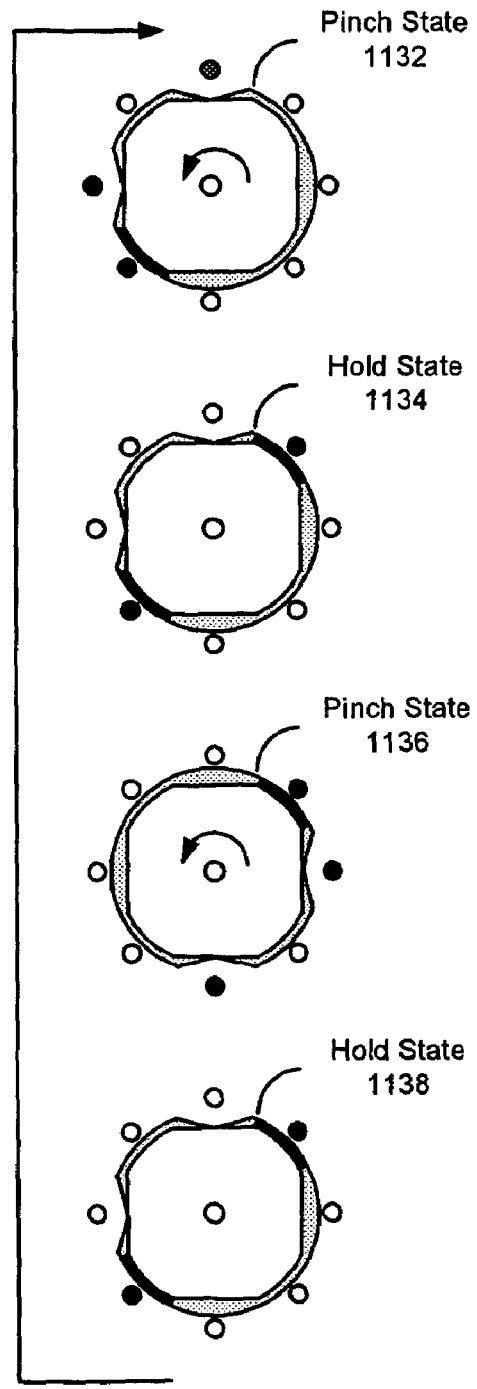

In the FIGS. 11B to 11D, when a brake is active, one of the circles 1102 (i.e., the circle associated with the brake) is darkened. If a brake is active, then the associated rotor portion 1114 is also darkened. Similarly, when a driver active, one of the circles 1102 (i.e., the circle associated with the driver) is darkened. If a driver is active, then the associated rotor portion 1112 is pinched. In addition, the rotor portion associated with the driver remains pinched during a next state. The circles 1102 and rotor portions 1112, 1114 are intended to be conceptual only; they may or may not correspond to actual components of a rotary motor.

FIG. 11B is intended to illustrate a free movement state for the rotary motor 1100. As shown in the example of FIG. 11B, none of the circles are darkened (indicating that none of the drivers or brakes are active). A free movement state is advantageous for certain applications, as described previously.

FIG. 11C is intended to illustrate a sequence of rotary motor states (in low gear). The first state is a pinch state 1122, in which drivers D1 and D3 are active and brakes B41 and B23 are active to cause the free portions of the flexor to move in the reverse (counter-clockwise) direction. The next state is a hold state 1124 in which all brakes are active and in which the previously pinched portions of the flexor remain as they were when the driver moved them to that position. The next state is a pinch state 1126 in which drivers D2 and D4 are active and brakes B12 and B34 are active to cause the free portions of the flexor to move in the reverse direction. The next state is a hold state 1128, in which the previously pinched flexor position is held by activating all four of the brakes. In an embodiment, the sequence of states may repeat from state 1122 to 1128 and back to 1122.

It may be noted that, in the example of FIG. 11C, each successive pinch state moves the pinch point by +90 degrees in a clockwise direction (while the rotor moves counter-clockwise). In this example, moving the pinch point around once requires four pinch states, and each pinch state activates two drivers. Hence each driver is activated twice per revolution of the pinch point. It may be further noted that, in the example of FIG. 11C, at least two brakes are active at all times, and that the driving force aggregates the force from two drivers.

FIG. 11D is intended to illustrate another sequence of rotary motor states (in high gear). The motor of FIG. 11D may be the same as the motor of FIG. 11C. As with the example of FIG. 11C, the sequence of states may start with a free movement state (see, e.g., FIG. 11B). In FIG. 11D, the first state is a pinch state 1132 in which drivers D1 and D4 are active and brake B34 is active. It should be noted that in the pinch state 1132, the active drivers are not opposite each other. Rather, the active drivers are adjacent to one another. The next state is a hold state 1134 in which brakes B12 and B34 are active and in which the previously pinched portions of the flexor remain as they were when the driver moved them to that position. The next state is a pinch state 1136 in which drivers D2 and D3 are active and brake B12 is active, allowing the free portions of the flexor to move in the reverse direction. The next state is a hold state 1138 with brakes B12 and B34 active. In an embodiment, the sequence of states may repeat from state 1132 to 1138 and back to 1132.

It may be noted that, in the example of FIG. 11D, each successive pinch state moves the pinch point by +180 degrees in a clockwise direction (while the rotor moves counter-clockwise). In this example, moving the pinch point around once requires two pinch states, and each pinch state activates two drivers. Hence each driver is activated once per revolution of the pinch point. It may be further noted that, in the example of FIG. 11D, some states have only a single brake active. It may be further noted that, in the example of FIG. 11D, some states have two drivers active, but those drivers are pulling against the same brake, not independently pulling against different brakes. Thus, the force is that of just one driver, but with twice the displacement.

If a rotary motor is driven according to the sequence of states described with reference to FIG. 11C and then driven with the same state transition speed according to the sequence of states described with reference to FIG. 11D, the movement in FIG. 11D is twice as fast but with half of the torque of FIG. 11C. In this way, these sequences are analogous to a two-speed transmission, with FIG. 11C corresponding to low gear and FIG. 11D corresponding to high gear. With six drivers and six brakes, three different sequences could be defined corresponding to three different gears, with the third gear having three times the speed and ⅓ the torque of low gear.

By controlling the sequencing of drivers and brakes as described with reference to FIGS. 11A to 11D, a multiple speed transmission can be implemented with the shifting between gears determined by the timing of a motor controller. Advantageously, in an embodiment, no mechanical linkages are required to change the drive ratio in this way, providing a significant benefit over prior art transmissions. The automatic transmission properties described previously with reference to Table 1 are also present in a rotary motor embodiment, but the existence of high and low gears further extends the range. In a four-driver rotary motor embodiment, for example, the PRatios in low gear are half of the PRatios in high gear.

Figure 12A:
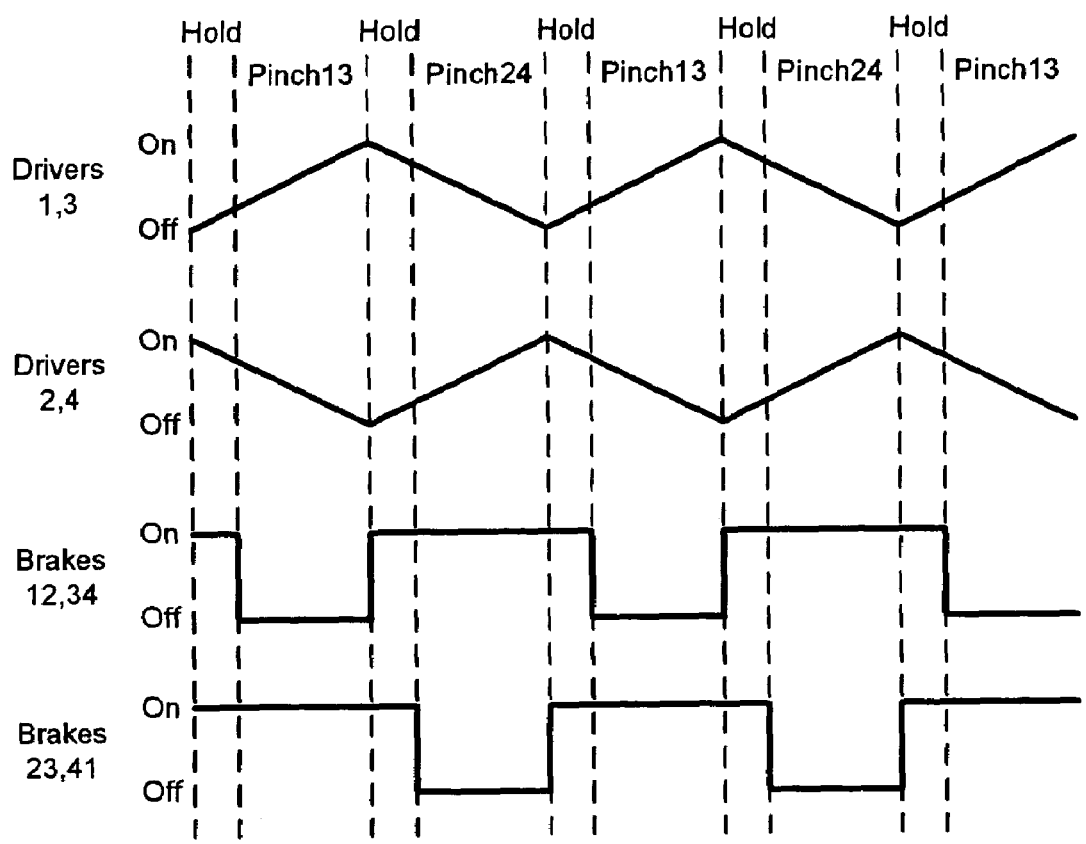
FIGS. 12A, 12B, and 12C depict timing diagrams for rotary motors according to respective embodiments.
Figure 12B:
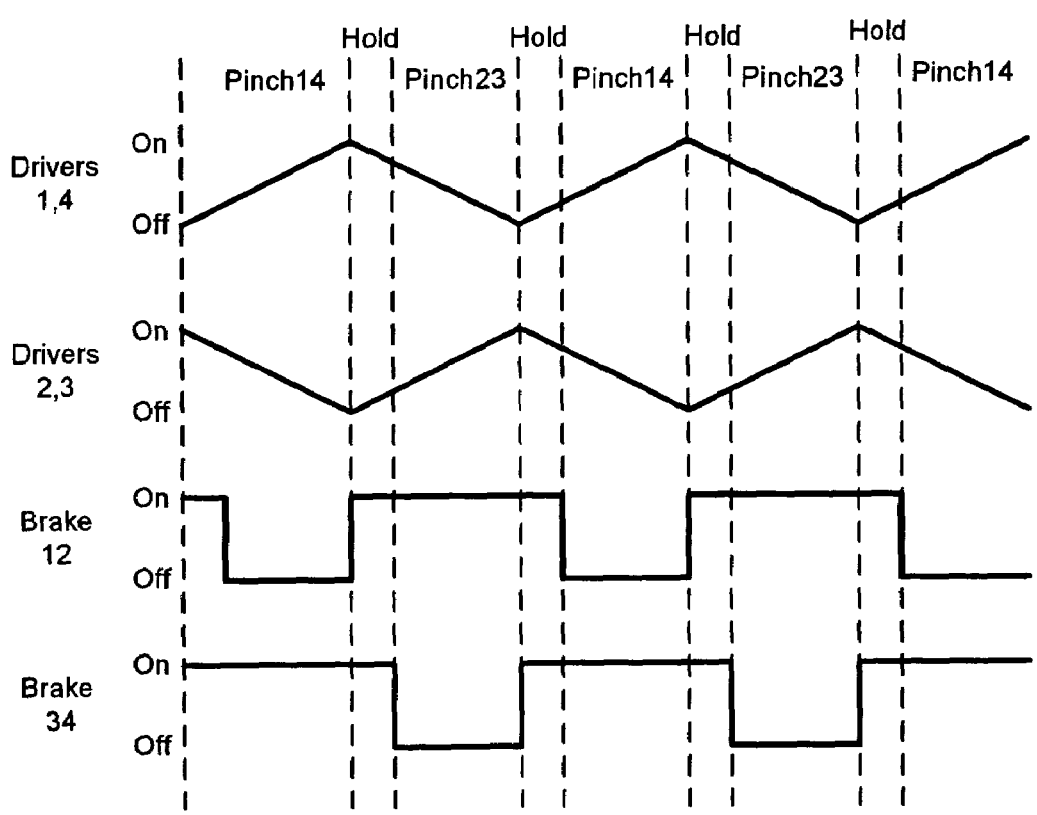
Figure 12C:
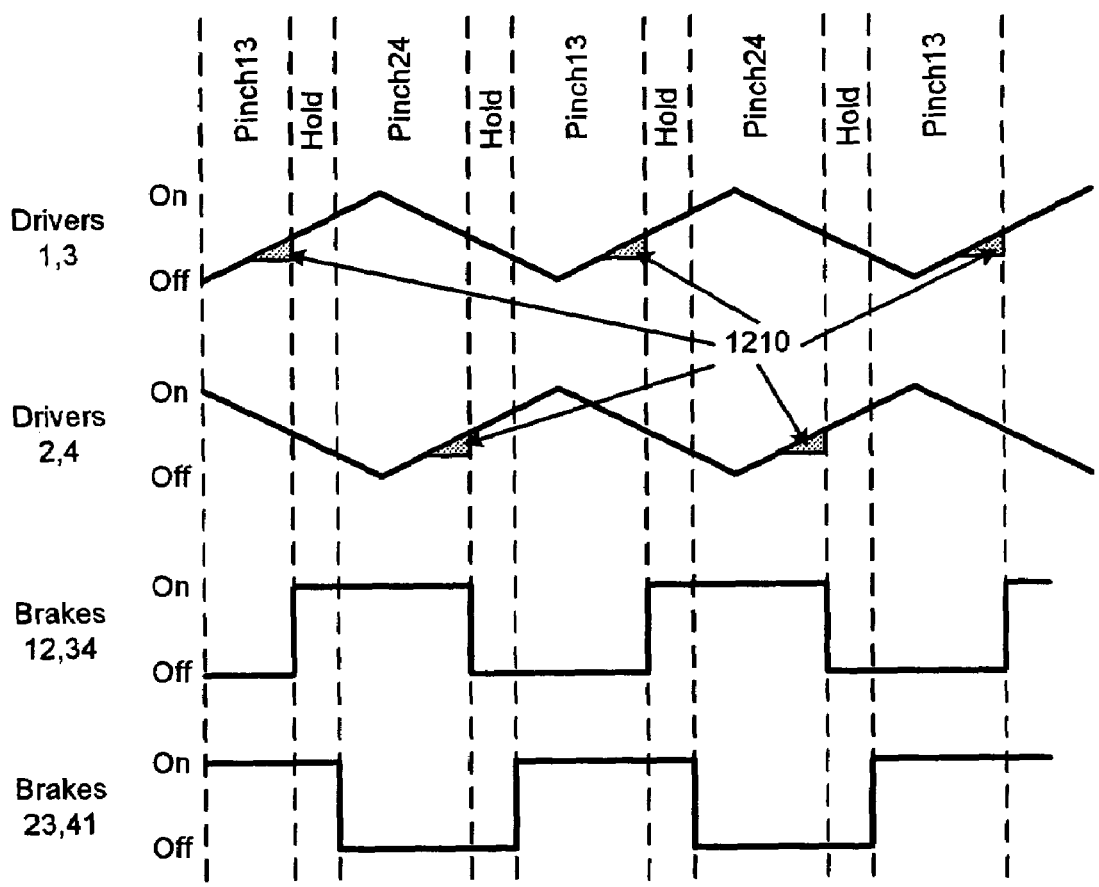

FIGS. 12A, 12B, and 12C depict timing diagrams for rotary motors according to respective embodiments. FIG. 12A shows a timing diagram 1202 corresponding to a low gear rotary motor operation, such as described with reference to FIG. 11C. Instead of showing the driver states in discrete steps, the timing diagram 1202 shows the transition of a driver from on to off. The state labels along the top of the timing diagram 1202 identify the current state as a hold state or a pinch state (and the drivers active in the pinch state). The timing diagram 1202 shows the hold times when the brakes are on. The hold periods start at or near the peak displacement of one of the drivers. In an implementation with sensors that allow detection of the current position of the drivers, the brake activations can be triggered near these peaks.

FIG. 12B shows a timing diagram 1204 corresponding to a high gear rotary motor operation, such as described with reference to FIG. 11D. For illustrative purposes, the timings are the same as in the example of FIG. 12A, but each waveform drives the activation of a different set of drivers or brakes.

FIG. 12C shows a timing diagram 1206 of ultra low gear rotary motor operation in which pairs of opposing drivers are driven as in low gear, but in which the driver stops delivering torque before it reaches its maximum displacement. By terminating early, the driver never reaches the lower PRatios, and, accordingly, drives at higher torque and lower displacement. In this diagram, shaded areas 1210 show the times during which a driver is applying torque to the output. The portion of the driver cycle after the shaded area is the time the driver is finishing its travel, but the brakes have been set to allow the diver to move without applying force against the output load. Using this technique, when the motor current hits a trip point, the brakes can switch to shed the load. In an embodiment, torque is applied to the load only during the shaded portions of the motor rotation.

Figure 13:
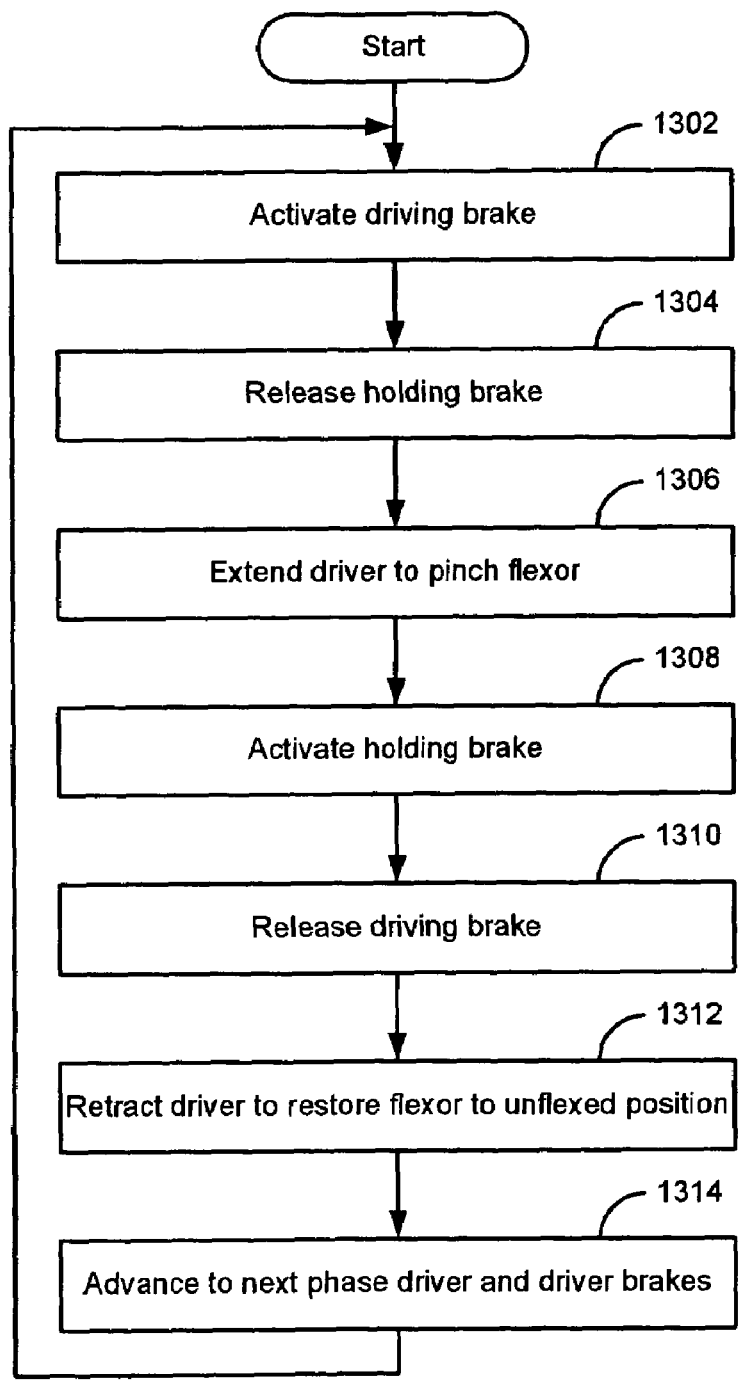
FIG. 13 depicts a flowchart of a brake and driver activation method according to an embodiment.

FIG. 13 depicts a flowchart 1300 of a brake and driver activation method according to an embodiment. The flowchart 1300 is sufficiently general that it may be used to describe a method applicable to, for example, a linear embodiment, a belted embodiment, a rotary embodiment, or some other embodiment of a "pinch" motor according to techniques described herein. For the purposes of example, it is assumed that a "pinch" motor includes a flexor and a stator assembly. The stator assembly includes brakes (including holding brakes and driving brakes, which may or may not be interchangeable) and drivers. This method and other methods are depicted as serially arranged modules. However, modules of the methods may be reordered, or arranged for parallel execution as appropriate.

In the example of FIG. 13, the flowchart 1300 starts at module 1302 where a driving brake is activated. All brakes and drivers are assumed to be disabled initially (or, alternatively, the drivers are disabled, but one or more holding brakes are enabled). If no brakes are initially enabled, then after module 1302, only the driving brakes are enabled. However, if one or more holding brakes are initially enabled, then after module 1302, the driving brakes and one or more holding brakes are enabled.

In the example of FIG. 13, the flowchart 1300 continues at module 1304 where previously active holding brakes (if any) are deactivated. In an embodiment, the module 1302 occurs before the module 1304 to allow for some overlap time with multiple brakes active. This may be desirable to reduce the probability of slipping when switching from one brake to another. If the example of FIG. 13, the flowchart 1300 continues at module 1306 where a driver is activated to pinch the flexor. This facilitates movement of a part of the flexor that is not held by a brake. The modules 1304 and 1306 may be associated with a "pinch state" of operation.

In the example of FIG. 13, the flowchart 1300 continues at module 1308 where a holding brake is activated to capture the movement just made in module 1306. In an embodiment, the holding brake also prevents a load force from moving the flexor opposite to the intended movement direction. In the example of FIG. 13, the flowchart 1300 continues at module 1310 where the driving brake is released. When the driving brake is released, some or all of the holding force is transferred to the holding brake. In the example of FIG. 13, the flowchart 1300 continues at module 1312 where the driver is retracted to its initial position. This facilitates the restoration of the flexor to an unflexed position. The modules 1308, 1310, and 1312 may be associated with a "hold state" of operation.

In the example of FIG. 13, the flowchart 1300 continues at module 1314 where advancement to the next driver and brakes occurs. In a linear or belted motor, there may be only one driver and one set of brakes, so no action is taken at module 1314 because the advancement may be considered inherent. In a rotary motor, on the other hand, advancement may involve moving to the next driver (clockwise or counter clockwise). In addition, the old holding brake may become the new driving brake, and another brake may be designated the holding brake. In the example of FIG. 13, the flowchart 1300 then continues from module 1302, as described previously. In an embodiment, the flowchart 1300 may repeat continuously.

Motors and actuators according to various embodiments may have the ability to work in reverse as generators. Generator mode may be used in portable power generating equipment, and may be used intermittently for regenerative braking to extend the life of batteries in battery-powered applications. DC motors may generate current when a shaft is driven by an external force. Piezoelectric elements generate a high voltage when a force is applied, and electrostatic (capacitive) actuators generate an increased voltage when an external force separates the plates. In an embodiment, a motor using such a reversible technology for its drivers can also become a generator by proper sequencing of the brakes and proper control of the phases connected to the drivers.

Figure 14:
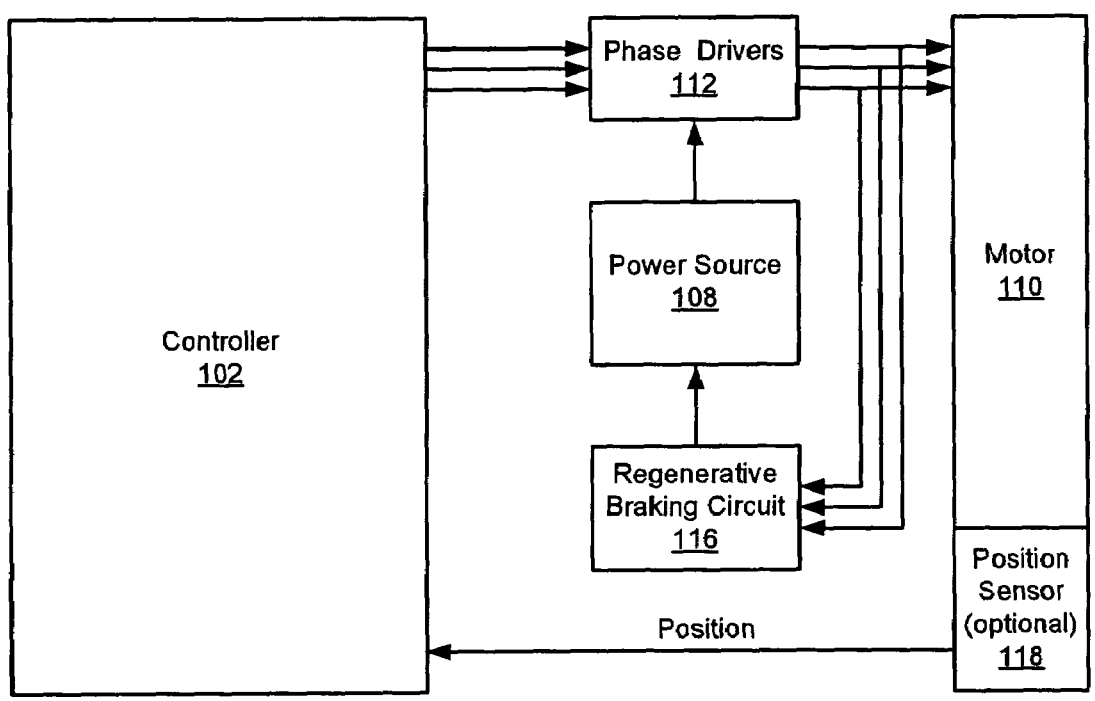
FIG. 14 depicts a conceptual view of a system with regenerative braking capabilities according to an embodiment.

FIG. 14 depicts a conceptual view of a system 1400 with regenerative braking capabilities according to an embodiment. The system 1400 is similar to the system 100 (FIG. 1), but includes a regenerative braking circuit 116 and an optional position sensor 118. The optional position sensor 118 could be included (or not included) in either of the systems 100, 1400. Previously described components of the system 100 may be included in the system 1400 (and may or may not be depicted in FIG. 14). Previously described components are not described again with reference to FIG. 14.

The motor 110 may be of any compatible type. However, generator mode is slightly different for linear and rotary drivers. With a linear driver, the driver electronics is first put into a mode where driver power from the phase drivers 112 is fed back to the power source 108 through the regenerative braking circuit 116. Once the electronics are in this mode, brakes associated with the motor 110 are sequenced in such a way that a flexor is alternately pulled tight and then relaxed against one or more drivers. Before each cycle, the driver must be extended into the wave gap, either by the inherent spring action of the driver or by activating the driver to move to that position. Then a brake is activated to stretch the flexor against the extended driver to force it to its non-extended position. The sequence is repeated at the next driver. With drivers that have a natural oscillation frequency of their own, such as piezoelectric drivers, it may be advantageous to cycle at a rate that causes the driver to oscillate near its resonant frequency. In generator mode, the mechanical advantage works in reverse to extract work from a slow moving, strong external force, delivering it as a fast sequence of small power bursts.

With a rotary driver such as a motor driving a cam or offset roller, the sequence is nearly the same, but the driver cannot be positioned exactly at its maximum extension position for each burst, because the external force at that position has its force vector pointing exactly at the center of the shaft, and there is no component of the force vector pushing the motor to rotate in either direction. If the motor is instead positioned to be at an angle just after its maximum extension position, the external force pulling the flexor tight will push against the cam or roller to push the motor back to its non extended position. Each cycle, the motor goes from motor mode to generator mode and back, with the phase timing set to make the external force turn the motor in one direction.

Figure 15:
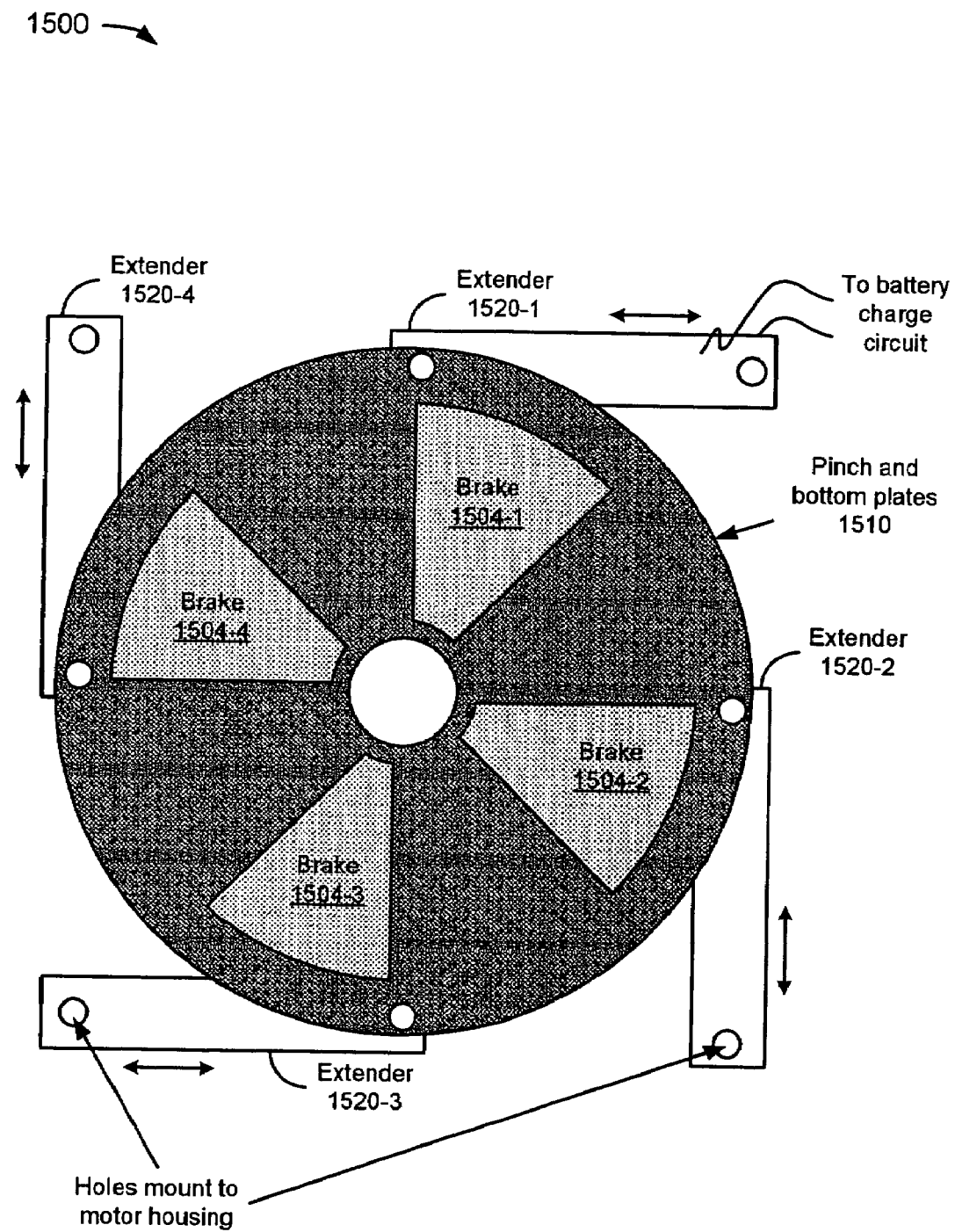
FIG. 15 depicts a conceptual view of a motor with generator mode capabilities according to an embodiment.

FIG. 15 depicts a conceptual view of a motor 1500 with generator mode capabilities according to an embodiment. In the example of FIG. 15, the motor 1500 is, for illustrative purposes, a rotary motor. In general, a generator mode can be applied to a rotary motor with brakes that can be controlled.

In the example of FIG. 15, the motor 1500 includes brakes 1504-1 to 1504-4 (collectively referred to hereinafter as the brakes 1504) and pinch and bottom plates 1510. In an embodiment, the brakes 1504 are electrostatic brakes, but other braking technologies could be used in other embodiments. The pinch and bottom plates 1510 are attached to a motor housing (not shown) through extenders 1520-1 to 1520-4 (collectively referred to hereinafter as the piezoelectric extenders 1520). Each time the brakes 1504 are pulsed, the piezoelectric extenders 1520 are pushed or pulled by a momentary force. If the brakes 1504 are pulsed at the resonant frequency of the piezoelectric extenders 1520, each pulse tends to increase the amplitude of the oscillations. The piezoelectric extenders 1520 generate an AC voltage when oscillating, and their output can be used to drive a load or can be rectified and used to recharge a battery.

The regeneration arrangement of FIG. 15 includes optional elements, but may simplify the electronics in cases where it is difficult to extract energy from the drivers (not shown) when they are in generator mode. Piezoelectric elements generate a high voltage that generally does not need to be boosted above the voltage of any batteries in the system. Another potential benefit of the circuit in FIG. 15 is that when not in generator mode, the piezoelectric elements serve as strain gauges that can directly report the torque being applied by the motor 1500. This force feedback can be useful in the control system using the motor 1500.

The flexing of a flexible element (e.g., a flexor) provides a variable ratio mechanical gain, called the pinch ratio, based on the angle that it is flexed when the driver pinches the flexible element. Mechanical work is delivered by the drivers with force or torque multiplied by the pinch ratio while the output speed is reduced by the pinch ratio. The pinch ratio can be varied electronically by changing the timing of the activation and deactivation of the brakes. When all brakes are disengaged, the flexible element is allowed to move freely. The brake timing and driver electronic design allow the motor to become a generator when an external force is applied.

As used herein, a motor associated with mechanical work that is delivered by drivers with force or torque multiplied by the pinch ratio may be referred to as a "pinch motor." The pinch motor can be used as a generator or for regenerative braking by timing the braking to drive energy back into the drivers, or through added piezoelectric elements. The pinch motor may include a stator and a flexor. As used herein, a flexor is a flexible element that is mobile with respect to the stator.

A motor constructed according to the techniques described herein may have many different arrangements. For example, in a motor with one driver, the torque is determined by the lesser of the holding torque of one brake and the driving torque of the driver, where the driving torque is the torque of the driver multiplied by the mechanical advantage, or pinch ratio (PRatio).

The linear (see, e.g., FIG. 2), belted (see, e.g., FIG. 5), and rotary (see, e.g., FIG. 9) motors described herein could be implemented using any applicable braking or driver technologies or technologies capable of applying braking or driving forces. The number of phases is not restricted to the number shown in any of the embodiments, and the motors of the embodiments could have more drivers and brakes arranged in serial or parallel fashion. The regenerative braking concepts could be used in applications where a motor is purely a generator and does not make use of its motor capabilities. The piezoelectric motor mount regeneration described herein could be applied to linear or belted motors, and the piezoelectric generators replaced by any other actuator technology with a generator capabilities. Furthermore, the materials used in construction are not limited to the ones described.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A belted motor, comprising:
    a driven flexor belt under tension from a first direction and connected to a load;
    a stator, including:
        a driver mounted to repetitively reciprocatively deflect the flexor belt by a certain amount in a second direction transverse to the first direction;
        a first brake and a second brake acting directly on the flexor belt with the driver therebetween, the first brake that, when operationally configured, is positioned to clamp the flexor belt at a first point and with the second brake being released permits motion of the flexor belt when the driver deflects the flexor belt and wherein;
        the second brake when operationally configured, is positioned to clamp the flexor belt at a second point when the first brake is released permits motion of the flexor belt in the first direction when the driver no longer deflects the flexor belt, the first and second brakes having means for operating alternately to provide repetitive incremental motion to the driven flexor belt and to the load corresponding to the certain amount of repetitive reciprocative deflection of the flexor belt.

2. The motor of claim 1, further comprising an extremity operationally connected to the load, wherein the extremity is mobile when the belt moves in the first direction.

3. The motor of claim 1, wherein the stator further comprises:
a tension gear that, when operationally configured, is coupled to the flexor belt applying tension thereto when the first brake is not clamping the flexor belt; and
an output gear that, when operationally configured, is coupled to the flexor belt and to the load, wherein when the flexor belt moves in the first direction, the flexor belt rotates the output gear and the output gear pulls the load.

4. The motor of claim 3, wherein the second brake, when engaged, substantially halts movement of the output gear.

5. The motor of claim 3, wherein the belt includes first teeth and the tension gear includes second teeth, and wherein the first teeth engage the second teeth such that the tension gear is pulled by the movement of the belt.

6. The motor of claim 3, wherein the belt includes first teeth and the output gear includes second teeth, and wherein the first teeth engage the second teeth such that the output gear is pulled by the movement of the belt.

7. A motor comprising:
a moveable flexor belt under tension in a first direction from a tension gear or roller and connected to rotate a rotatable output gear or roller, the moveable linear flexor belt communicating with first and second brakes that act directly on the flexor belt and are operable to apply braking force by a timing means for operating the first brake and releasing the second brake, then operating the second brake and releasing the first brake, then repeating the sequence; and
a driver applying repetitive flexing to the flexor in a second direction transverse to the first direction only when one of the brakes is released in a manner that repetitively incrementally rotates the rotatable output gear or roller corresponding to repetitive flexing of the flexor.

8. The motor of claim 7 further comprising an extremity operationally connected to the output gear or roller wherein the extremity is rotationally mobile when the flexor moves in the first direction.

9. The motor of claim 7 wherein the driver is a linear actuator.

10. A motor driven extremity comprising:
a flexor belt under tension from a drive gear or roller toward an output gear or roller in a first direction, the output gear or roller carrying an extremity;
first and second braking means between the drive gear or roller and the output gear or roller, with each of the braking means alternately clamping and releasing the flexor belt; and
a driver means coupled between said first and second braking means for repetitively moving a portion of the flexor belt that is not held by one of the braking means by a certain amount in a second direction transverse to the first direction, the tension from the drive gear or roller advancing the flexor belt toward the drive gear or roller in the first direction as the output gear or roller rotates an amount corresponding to the certain amount of movement of the driver means in the second direction.

11. The system of claim 10, wherein said driver means includes a linear actuator.

12. The system of claim 11, wherein said linear actuator is electrostatic.

13. The system of claim 11, wherein said linear actuator is electromagnetic.

14. The system of claim 10 wherein said driver means includes a cam actuator.

15. The system of claim 10, wherein said driver means includes an offset roller actuator.

16. The system of claim 10, wherein said driver means includes a bender actuator.

17. The system of claim 10, wherein said braking means includes a linear actuator.

18. The system of claim 17, wherein said linear actuator is electrostatic.

19. The system of claim 10, wherein said braking means includes a plurality of electrodes coupled to a conductive shaft.

20. The system of claim 10, wherein said braking means includes an actuator with gear teeth for engaging a pinch plate with gear teeth.

21. A motor driven extremity comprising:
a flexor belt under tension fed from an output gear or roller carrying an extremity toward a drive gear or roller in a first direction and receiving impulsive force in a second direction transverse to the first direction;
a first brake means for clamping and releasing the flexor belt at a first point and a second brake means for clamping and releasing the flexor belt at a second point, the clamping of one brake means for at least some time when the flexor belt is released by the other brake means; and
a driver means for applying a certain amount of repetitive impulsive force to the flexor belt at a third point between the first point and the second point, the timing of impulsive force corresponding to the clamping by one of the brake means wherein impulsive force causes rotation of the output gear or roller carrying the extremity by an incremental amount.

22. The motor of claim 21 wherein the drive gear and the output gear or roller are reversible in roles wherein the first direction is reversed and the rotation of the output gear or roller is reversed.

* * * * *

UNITED STATES PATENT AND TRADEMARK OFFICE
CERTIFICATE OF CORRECTION

PATENT NO. : 7,365,463 B2
APPLICATION NO. : 11/033368
DATED : April 29, 2008
INVENTOR(S) : Robert W. Horst et al.

Page 1 of 1

It is certified that error appears in the above-identified patent and that said Letters Patent is hereby corrected as shown below:

Column 15, line 65 PRation equation $$\frac{\pi \cdot r}{\sqrt{h^2 + l^2} - 1} - s$$

should read:

$$\frac{\pi \cdot r}{\sqrt{h^2 + l^2} - l - s}$$

Signed and Sealed this

Twenty-eighth Day of April, 2009

JOHN DOLL
*Acting Director of the United States Patent and Trademark Office*